US011275576B2

(12) United States Patent
Le et al.

(10) Patent No.: US 11,275,576 B2
(45) Date of Patent: Mar. 15, 2022

(54) TECHNIQUES FOR FIRMWARE UPDATES WITH ACCESSORIES

(71) Applicant: Apple Inc., Cupertino, CA (US)

(72) Inventors: Hung Q. Le, Mountain View, CA (US); Zaka Ur Rehman Ashraf, Pleasanton, CA (US); Keith W. Rauenbuehler, San Francisco, CA (US); Christopher B. Zimmermann, San Jose, CA (US); Keith R. Bisset, Mountain View, CA (US); Sivaramachandran Ganesan, Sunnyvale, CA (US); Wayne A. Lee, San Francisco, CA (US); Praveen Chegondi, Milpitas, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/111,411

(22) Filed: Dec. 3, 2020

(65) Prior Publication Data

US 2021/0397432 A1    Dec. 23, 2021

Related U.S. Application Data

(60) Provisional application No. 63/041,655, filed on Jun. 19, 2020.

(51) Int. Cl.
*G06F 15/16* (2006.01)
*G06F 8/65* (2018.01)
*G06F 8/61* (2018.01)

(52) U.S. Cl.
CPC . *G06F 8/65* (2013.01); *G06F 8/61* (2013.01)

(58) Field of Classification Search
CPC .................................. G06F 8/61; G06F 8/65
See application file for complete search history.

(56) References Cited

U.S. PATENT DOCUMENTS 10,162,968 B1    12/2018 Kumar et al.
10,412,052 B2    9/2019  Bone et al.
(Continued)

OTHER PUBLICATIONS

Hong et al., "Measurement Study Towards a Unified Firmware Updating Scheme for Legacy IoT Devices", 14th Asia Joint Conference on Information Security (AsiaJCIS). IEEE, 2019, 2 pages.

*Primary Examiner* — Lewis A Bullock, Jr.
*Assistant Examiner* — Mohammad H Kabir
(74) *Attorney, Agent, or Firm* — Kilpatrick Townsend & Stockton LLP

(57) ABSTRACT

Techniques are provided for updating firmware of an accessory device. An accessory development kit of the accessory device can communicate with an accessory update daemon using a home management daemon of a controller device. Based on a firmware update policy of the accessory device, the accessory update daemon will check for firmware updates. When firmware updates are available, the accessory update daemon can instruct the home management daemon to stage the update. The home management daemon will notify the accessory development kit to be in a stage mode. The accessory update daemon will download the firmware update and send the firmware update to the accessory development kit of the accessory device using an interface for the secure channel provided by the home management daemon. The accessory device can be a third party accessory device that does not have its own firmware updating application.

16 Claims, 18 Drawing Sheets

(56) References Cited

U.S. PATENT DOCUMENTS

| | | |
|---|---|---|
| 2007/0208782 A1 | 9/2007 | Carter et al. |
| 2010/0131084 A1* | 5/2010 | Van Camp ................ G06F 8/65 |
| | | 700/86 |
| 2012/0036220 A1* | 2/2012 | Dare ....................... H04L 67/04 |
| | | 709/217 |
| 2013/0339734 A1 | 12/2013 | Vernia et al. |
| 2014/0282486 A1* | 9/2014 | Hisamoto ................ G06F 8/65 |
| | | 717/173 |
| 2017/0054594 A1 | 2/2017 | Decenzo et al. |
| 2021/0081188 A1* | 3/2021 | Rajagopalan ............ G06F 8/65 |

* cited by examiner

TECHNIQUES FOR FIRMWARE UPDATES WITH ACCESSORIES

CROSS-REFERENCE TO RELATED APPLICATIONS

This application claims the benefit of U.S. provisional patent application No. 63/041,655, filed Jun. 19, 2020, which is incorporated by reference in its entirety.

BACKGROUND

Accessory devices, such as kitchen appliances, lighting fixtures, thermometers, etc., are often used in an automated environment, such as in a home automated environment. The accessory devices can be controlled by a controller device, such as, a laptop, mobile device, wearable device, etc.

Accessory devices include firmware, which is software that provides instructions for the hardware of the accessory device. Changes are often made to the firmware. For example, the firmware may need to be updated in order to provide improvements to the accessory device or to fix any issues or bugs in the operation of the accessory device.

In order for an accessory device to update its firmware, the accessory device can use a firmware application. The firmware application can obtain update files and provide the update files to the accessory device. If an accessory device has its own firmware application, then the accessory device can perform firmware updates.

However, an accessory device may not have an application for updating its own firmware. A manufacturer may not want to build and maintain a firmware updating application for an accessory device. It can be costly and time consuming to include and maintain a firmware update application.

However, it can be difficult to update the firmware for an accessory device that does not have a firmware updating application or the capability to update its own firmware. Instead, the user may have to purchase a new accessory device that contains the update. Alternatively, the user may have to contact the manufacturer who would then provide instructions for performing a firmware update. Therefore, the process for performing the update on the accessory device can be inconvenient and costly.

Since the firmware cannot be easily updated, the firmware for some accessory devices may become outdated. Outdated firmware can result in errors in the operation of the accessory device and/or the accessory device may not operate at its full capacity.

SUMMARY

Embodiments provide systems, methods, and computer-readable media for updating firmware for accessory devices.

An example embodiment provides a firmware update service that is designed to update firmware for accessory devices that do not have their own firmware update application. Example embodiments can apply to accessory devices that are made by third parties. The accessory devices can communicate with a home management daemon (HD) of a controller device via a secure channel using an accessory development kit (ADK) of the accessory.

The updates can be performed manually. That is, the system waits for the user to apply and/or request a firmware update instead of automatically installing the firmware update. The process of installing the firmware is initiated by user interaction to install the update.

The controller device can be updated with an accessory update daemon (AUD) that is configured to help implement the firmware updates. The accessory update daemon can be provided on the operating system (e.g., CoreOS) of the controller device. The home management daemon will register an interest in an accessory with the accessory update daemon for an accessory. Based on update policies, the accessory update daemon will check for firmware updates for that accessory that the home management daemon has registered for.

When a new firmware update is available, the accessory update daemon will notify the home management daemon that an update is available. The home management daemon can provide the notification to the accessory development kit of the accessory device. The accessory update daemon will then download the firmware update and send the update to the accessory development kit of the accessory using an interface for the secure channel of home management daemon.

As discussed above, some manufacturers do not want to build an application for performing firmware updates. Further, different manufacturers may use different protocols for performing a firmware update. Therefore, the protocol used by a controller device may be different from the protocol used by an accessory device that is made by a different manufacturer.

Example embodiments reduce the cost of development for the accessory devices, since an application does not need to be built and maintained for each accessory device. Instead, accessory devices can use the protocols of the home application. A controller device can provide any needed firmware to an accessory device without the accessory device needing an application for performing firmware upgrades.

Example embodiments provide an easy solution for updating the firmware of accessory devices made by different manufacturers, since the protocol of the home application will be used to update the third-party accessory devices.

Further, example embodiments can provide a completely reliable firmware update for a third party accessory. Side effects, such as "bricking" will not result. "Bricking" occurs when the accessory device is damaged, misconfigured, the firmware is corrupted, or there are hardware problems, and therefore, no longer functions as desired.

Also, example embodiments will eliminate the need for third-party applications in order to update firmware. In addition, the firmware updates can be performed in the background without requiring user attention and without requiring specific applications to be running in the foreground. Any firmware update process from the manufacturer of accessory device will be unnecessary.

Other embodiments are directed to systems, portable consumer devices, and computer readable media associated with the methods described herein.

A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

In the following description, for the purposes of explanation, specific details are set forth in order to provide a thorough understanding of the exemplary embodiments. However, it will be apparent that various embodiments may be practiced without these specific details. The figures and description are not intended to be restrictive.

A home application on a controller device (e.g., laptop, mobile device, wearable device, etc.) may be used to control accessory devices in a home automated environment. The accessory devices can also be known as smart devices or smart home devices. For brevity, an accessory device may also be referred to as an accessory, and a controller device may also be referred to as a controller throughout the description. The home application can be used to control the operation of the accessory devices in an automated environment via the controller device. The automated environment can be, for example, within a home or office of the user. Additionally, in some examples, a resident device may be a type of a controller. A resident device (e.g., a network-connected media player and/or a television control unit) can be installed within the automated environment and it may be expected that the resident device will be relatively immobile (e.g., it generally resides within the home or office). Resident devices may be configured to control particular accessories (e.g., a television or external speakers); however, it may also control other accessories that are also controlled by other controllers, when those other controllers are in reach.

The manufacturers of accessory devices can vary. Further, the manufacturers of an accessory device can be different from the manufacturer of a controller device. When the accessory device is from a different manufacturer than the controller device, the accessory device is called a third-party device. Devices that are made by different manufacturers may follow different protocols.

In the past, a controller device of a first manufacturer cannot easily perform updates for an accessory device made by a second manufacturer. Example embodiments provide an easy and convenient way for updating the firmware of third-party accessory devices. Specifically, example embodiments provide a convenient method for updating the firmware of third-party accessory devices that do not have their own firmware update applications.

I. Firmware Updating System

A. General Overview

Figure 1:
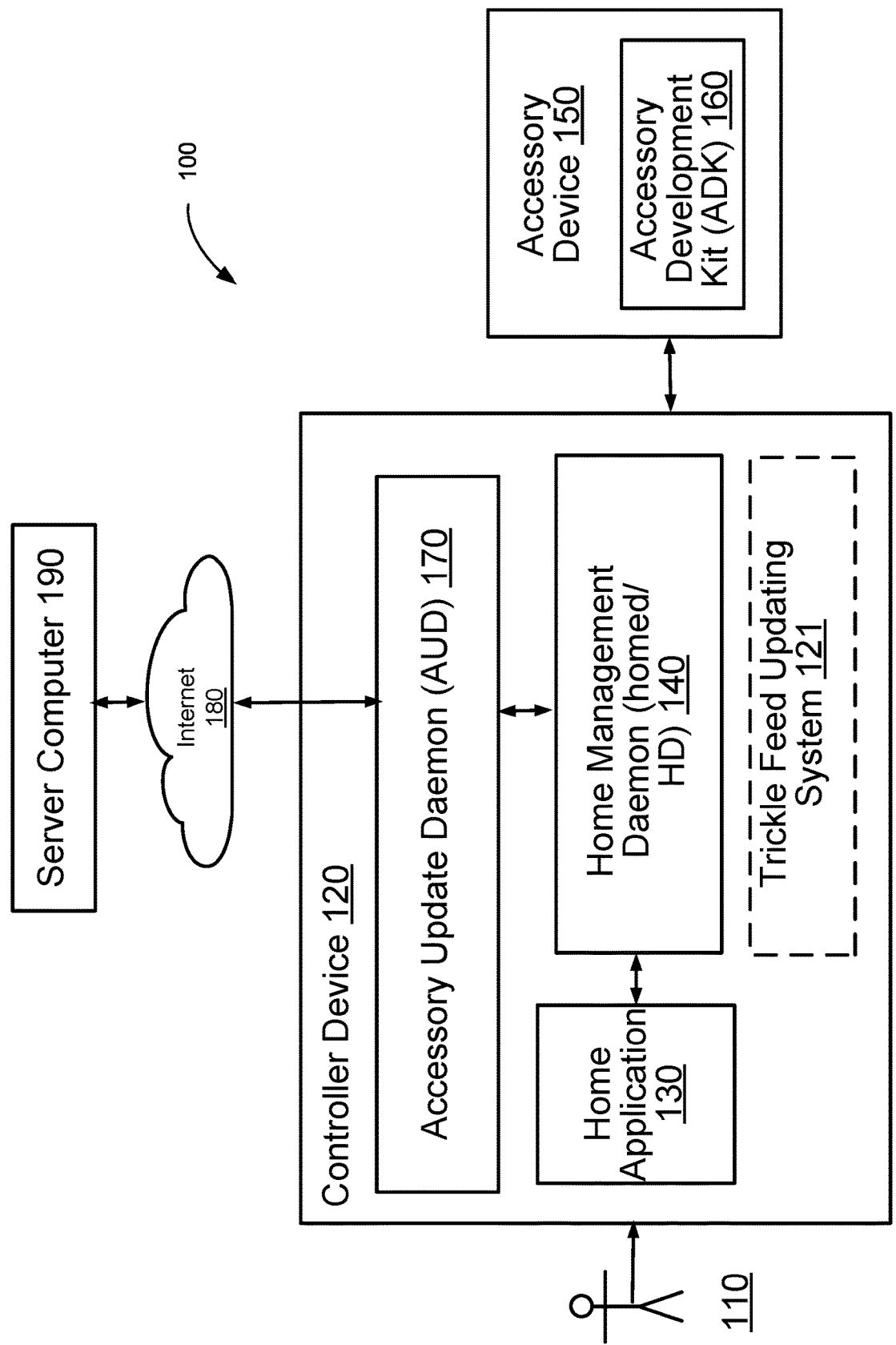
FIG. 1 illustrates a block diagram of a system that is configured to update firmware for an accessory device, in accordance with some example embodiments.

FIG. 1 illustrates a block diagram of a system 100 that is configured to update firmware for an accessory device, in accordance with some example embodiments.

As shown in FIG. 1, the system 100 can include a user 110, a controller device 120, an accessory device 150, a public or wide area network (WAN) (e.g., the Internet) 180, and a server computer 190. As shown in FIG. 1, the controller device 120 includes an accessory update daemon (AUD) 170, a home application 130, a home management daemon (HD) 140 and a trickle feed updating system 121. The home management daemon may also be referred to as homed throughout the description. The home application 130 may also be referred to as a home management application. The accessory device 150 can include an accessory development kit (ADK) 160.

The user 110 can correspond to a user of the controller device 120. The user can add or remove devices from an automated environment using the home application 130. The home application 130 can provide a user interface for providing status information to the user. The home application 130 can also be used to control the devices in the automated environment. The user 110 can control accessory devices in an automated environment. Although a single user is shown in FIG. 1, there may be a plurality of users within an automated environment.

The controller device 120 can correspond to a user device, such as a mobile phone, tablet, or laptop computer. The controller device 120 may be any suitable electronic device capable of transmitting and receiving data wirelessly using one or more suitable wireless communication protocols (e.g., WiFi, Bluetooth®, Bluetooth BLE®, etc.). For example, the controller device 120 may be a home owner's mobile phone. The controller device can have a process that is running daily on devices that can check whether a firmware update file should be pulled from the server.

The user can configure the home application 130 so that the user receives firmware updates for one or more of the accessory devices. Further, the user can identify which accessory devices the user would like to receive policy updates for. Firmware updates can be provided for the devices selected by the user. The user can also configure updates based on the type or category of the accessory device.

The home application 130 can be installed on the controller device 120 at the time of manufacturing or the home application 130 can be installed by the user after purchasing the controller device 120. The home application 130 can provide a user interface for controlling accessory devices in the user's automated environment. The user interface of the home application can also provide notifications to the user. The user interface provides the user with status information and control information for controlling firmware updates.

The accessory update daemon 170 of the controller device 120 can perform an accessory update service for updating firmware for accessory devices. The accessory update daemon 170 can be obtained from the server computer 190 via the Internet 180. The accessory update daemon 170 can be obtained from the server computer 190 when it is determined that the accessory update daemon 170 is needed to perform a firmware update for third-party accessory device.

The accessory update daemon 170 provides the formatting of information, instructs the pulldown of information from server computer 190, and provides the structure of the messages communicated between the server computer 190 to controller device 120 and to the accessory device 150.

The accessory update daemon 170 can also fetch the firmware from the server computer 190 and validate that the fetch has worked and that a valid file has been obtained. A cryptographic hash can be created for the URL from the firmware that was fetched from the server computer 190. The cryptographic hash can be stored with the URL to ensure security of accessing the URL data. Therefore, at the time the manufacturer provided the firmware information, the file is validated to determine that a valid file has been obtained and a hash is generated for the URL. In the future, if the file is pulled, it can be determined whether the file is the same as that which was previously pulled or if it is a different file based on the value of the hash. If the hash is different, it can be determined that the file is a different file.

The accessory update daemon 170 also determines whether there are any updates for an accessory device. If there are updates, the accessory update daemon 170 will pull any update files from the server computer 190. The accessory update daemon 170 can also communicate with the accessory development kit 160 on the accessory device 150 to notify the accessory development kit that there will be an update, and that it will be sending the update information.

The home management daemon 140 of the controller device 120 can provide a device management service for managing accessory devices. The home management daemon provides a channel for communication between the server and the accessory device. The home management daemon 140 has a secure communication channel to the accessory device 150. The home management daemon 140 gives the accessory update daemon 170, the mechanism with which to have a secure channel.

The home management daemon 140 provides bytes that the accessory device 150 can use to obtain the firmware updates. The home management daemon 140 provides an interface through which the bytes are sent to the accessory device. The bytes can include the firmware update file as well as control messages. The control messages can indicate how much of the firmware data has been sent to the accessory device. Control and update progress information is also sent via the secure channel with the firmware update bytes.

The controller device 120 can also include a trickle feed updating system 121. The trickle feed system updating 121 can be used to determine the rate at which firmware updates are sent to an accessory device. When the trickle feed updating system 121 is enabled for a firmware update, the firmware can be updated gradually, over time, as opposed to in a single instance.

Accessory device 150 can correspond to any one of many different types of accessory devices that are used within an automated environment. For example, accessory device 150 can be a light, an outlet, a switch, a fan, a stateless switch, an air quality sensor, a humidifier sensor, a motion sensor, an occupy sensor, a flood sensor, a thermostat, thermostat, an air conditioner, an air purifier, a humidifier, a WiFi Router, an IP camera, a speaker, a sprinkler, a TV, a blind or shade, a remote, a CO sensor, CO2 sensor, smoke sensor, contact sensor, garage door, door lock, door, window, security System, and IP camera doorbell, bridge accessory devices, and any other type of device that can be controlled electronically in an automated environment. These are merely examples and an accessory device is not limited to these examples.

Accessory device 150 can include an accessory development kit (ADK) 160 that can be used to communicate with the home management daemon. The accessory development kit (ADK) 160 can provide a data pipe through which messages are sent and received by the accessory device.

Server computer 190 is a computer comprising firmware for conducting updates. Although a single server computer 190 is shown, server computers for different manufacturers and for different accessory devices can be used to provide firmware updates. Firmware updates for different accessory devices can be provided by different server computers. In the alternative, a single server computer 190 can be used by a plurality of different manufacturers. The server computer 190 can store a URL associated with firmware for an accessory device.

The controller device 120 and the accessory device 150 may be made by different manufacturers. Different manufacturers often use different protocols for controlling the operation of their devices. Therefore, although the accessory device can be added to a user's automated environment, it may be difficult to update the firmware for the accessory device. Therefore, an example embodiment provides a convenient and cost-effective method for updating firmware when the manufacturer of the accessory device is different from that of the controller device.

B. System Design

Figure 2:
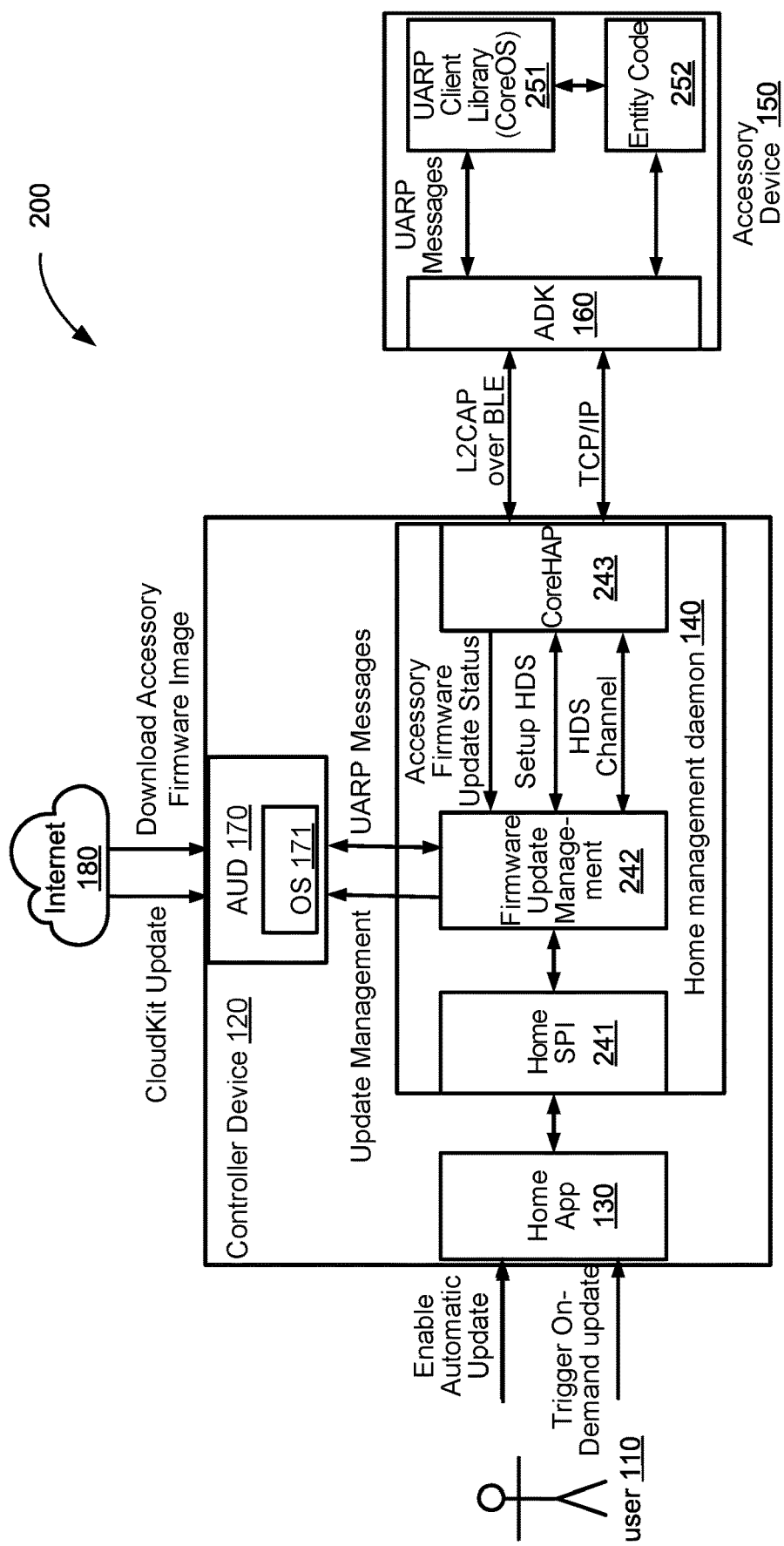
FIG. 2 is a block diagram of a system design for updating firmware, in accordance with some example embodiments.

FIG. 2 is a block diagram of a system design 200 for updating firmware, in accordance with some example embodiments.

System 200 includes user 110, accessory update daemon 170, home management daemon 140 and accessory device 150 and internet 180. Elements shown in FIG. 2 correspond to those shown in FIG. 1. Therefore, for purposes of brevity, similar descriptions will not be repeated.

As shown in FIG. 2, the accessory update daemon 170 can include an operating system 171. Operating system 171 can be a core operating system (coreOS). Operating system 171 can provide the infrastructure to monitor update availability, validate, notify and deliver updates. Operating system 171 can manage made for iPhone/iPod/iPad (MFi) and the development of a portal used to submit firmware updates.

Operating system 171 can also enable side loading of accessory firmware update information.

The accessory update daemon 170 includes a framework that provides an interface (e.g., Home serial peripheral interface (SPI) 241) for accessory devices of interest to be registered. The accessory devices can be registered automatically based on the support advertised by the accessory device. The framework provided by AUD can include, for example, a Core Universal Accessory Restore Protocol (CoreUARP). The framework includes firmware information such as, product group, product number, assets of interest, type, etc. The framework for the accessory update daemon 170 is flexible and can accommodate future extensions and changes in versions of an accessory device.

The accessory update framework provides an interface that allows users to unregister interest in accessory devices, query the status of registered accessory devices, update current asset information for an accessory device, receive notification of available updates, pass a message channel object that provides reliable and secured data channel with an accessory device, stage asset to accessory, apply an asset update on an accessory device, and cancel staging.

The accessory update daemon 170 is configured to monitor for available asset updates of registered interested accessory devices, download the asset updates and validate authenticity and integrity of assets from various server sources as they become available, notify clients of available updates, stage asset to accessory, and apply an asset update on an accessory device.

The accessory device 150 can include Universal Accessory Restore Protocol (UARP) client library 251. The accessory development kit (ADK) 160 can host a UARP client library 251 that knows how to decode UARP messages from the firmware update. The UARP client library 251 can implement UARP on the accessory device to handle receiving assets from controllers, and process packaging of assets. UARP client library 251 can communicate with manufacturer code 252.

The accessory development kit (ADK) 160 can integrate with UARP client library 251 and provide UARP client library 251 with the data pipe to send and receive messages, update to HTTP Dynamic Streaming (HDS) implementation for Quality of Service (QoS), and update to HDS implementation to reduce overhead for Bluetooth Low Energy (BLE).

The UARP protocol uses a transport protocol that provides reliability, fragmentation and re-assembly, security and is bi-directional (both sides can send messages once the channel is established).

Accessory device 150 can be a Wi-Fi, Ethernet or Bluetooth device. However, Wi-Fi and Ethernet devices may not be as concerned with bandwidth or latency. The existing HDS over transfer control protocol (TCP) can be used with a minimal amount of changes to the protocol stack necessary to support firmware update. The UARP protocol layer is configured to provide an application protocol to perform firmware updates. The HDS protocol layer is configured to perform encryption, authentication, and multiplex Protocols. The TCP/IP protocol layer is configured to provide a reliable byte stream with fragmentation and re-assembly.

HDS can be implemented over HAP (e.g., core HAP 243). In this instance, the UARP protocol layer is configured to provide an application protocol to perform the firmware update. The HDS protocol layer is configured to provide multiplex protocols. The HAP protocol layer is configured to provide an encrypted reliable data channel with fragmentation and re-assembly. UARP is an application layer protocol that can ride on top of HDS.

An example embodiment provides a reduction in HDS overhead and an optimization in throughput. HDS can multiplex different application traffic across the same TCP connection.

The firmware update manager 242 can manage the update process across all accessory update daemon updatable accessory devices. The firmware update manager 242 can also manage memory, CPU, and connectivity (e.g., BLE duty cycle). The firmware update manager 242 can monitor device state and pause downloads as appropriate (e.g., ATV starts streaming 4k content, phone in low power/low data mode). The firmware update manager 242 can decide when an accessory should begin staging and applying updates based on the home management daemon accessory firmware update policy.

The firmware update manager 242 contains a list of all of the accessory devices that can be updated by accessory update daemon. Further, firmware update manager 242 can manage the lifecycle of current update sessions, can be notified by a UARP controller when an update is available, can create a home management daemon accessory firmware update session, can register with the UARP controller for each new accessory update daemon updatable accessory that has been configured (homed startup, accessory added), and can deregister with the UARP controller accessory devices removed from the home. The UARP controller can be part of the CoreUARP framework that is used by the home management daemon to interface to AUD.

The management daemon accessory firmware update session can execute the update process for a single accessory. The management daemon accessory firmware update session can also communicate with the UARP controller.

Existence of a session indicates that an update is available. The session is removed once the update has been applied successfully. A home management daemon accessory firmware update connection protocol can be used by the object to send the firmware asset to an accessory over UARP methods, such as, sendData(bytes, length), recvData(bytes, maxLength), pauseConnection, resumeConnection and closeConnection.

In order to operate the accessory update daemon, the home application 130 can perform registration for the accessory update daemon, deregistration of the accessory update daemon, and staging of firmware on the accessory device. The home management application also has signaling capabilities and auditing capabilities. The home management application is configured to register an accessory identified with unique ID, product group, product number, and current firmware version. The unique ID can be used to indicate if the accessory was registered, updated (e.g., firmware version), already exists, or is not known/managed by accessory update daemon.

The accessory update daemon framework also allows the home management application to deregister an accessory, allows for the staging of firmware on the accessory device by passing in a connection object, provides a way to do device-side flow-control, allows for pausing and resuming, and sets a maximum data rate.

The accessory update daemon framework allows for signaling by providing a signaling or delegating method for indicating that new firmware is available, that the staging is complete, but staging has failed, or that the accessory firmware has been updated.

The accessory update daemon framework allows for auditing by the home management application. The home management application can obtain a list of accessory devices that accessory update daemon is monitoring, the IDs of the accessory devices, the product group of the accessory devices, the product number of the accessory devices and the current firmware version of the accessory devices.

The accessory update daemon also allows for cache control. For example, in a multiple resident home, the accessory update daemon can be used to control which resident downloads the firmware. Cache control can reduce network load, disk usage, etc. Each unique firmware asset can have a unique identifier to allow tracking across accessory devices that use the same firmware.

The cache control prevents or enables the accessory update daemon to download the firmware from the manufacturer. The cache control will also query if the firmware identified by the asset ID is locally cached.

Error control can be provided for both manual and automatic updating. In an example embodiment, for manual updating, when there is an error, an error is returned to the user unless otherwise specified.

For automatic updating, an error recovery process can include, based on the current version of the accessory, the staged asset (if any), the update being applied, and deciding if this device should continue applying the update. For example, if the version staged on the accessory is greater than the current update, the session can be abandoned.

The error recovery process can also include, based on the state of the accessory and the state of the session, deciding on the new state of the session such as whether an asset is available, if it is ready to stage, if it is ready to be applied or if the application is in progress.

The error recovery process can also check a retry count and abandon the operation if the retry count is over some limit. Further, the error recovery process can include waiting according to an exponential backoff rule, and retrying directly or via a scheduler. In certain instances, it can be determined that attempting the accessory update should be abandoned.

If it is determined that updating of the firmware should be abandoned, then the current session will be removed. In such cases, it can be determined whether this decision need to be persisted locally and if it will retry on restart. It can also be determined whether other devices need to be notified about the failed update or other devices should be allowed to try to update themselves.

Memory usage in the home management application is managed in order to prevent spikes in memory usage during transfer of the firmware update. Multiple simultaneous transfers can be managed along with the UARP message size that is passing through homed management daemon. Firmware updates can be paused to prevent pressures on memory usage and resumed when the memory pressure is lowered.

II. Firmware Updating Method

A. System Overview

Figure 3:
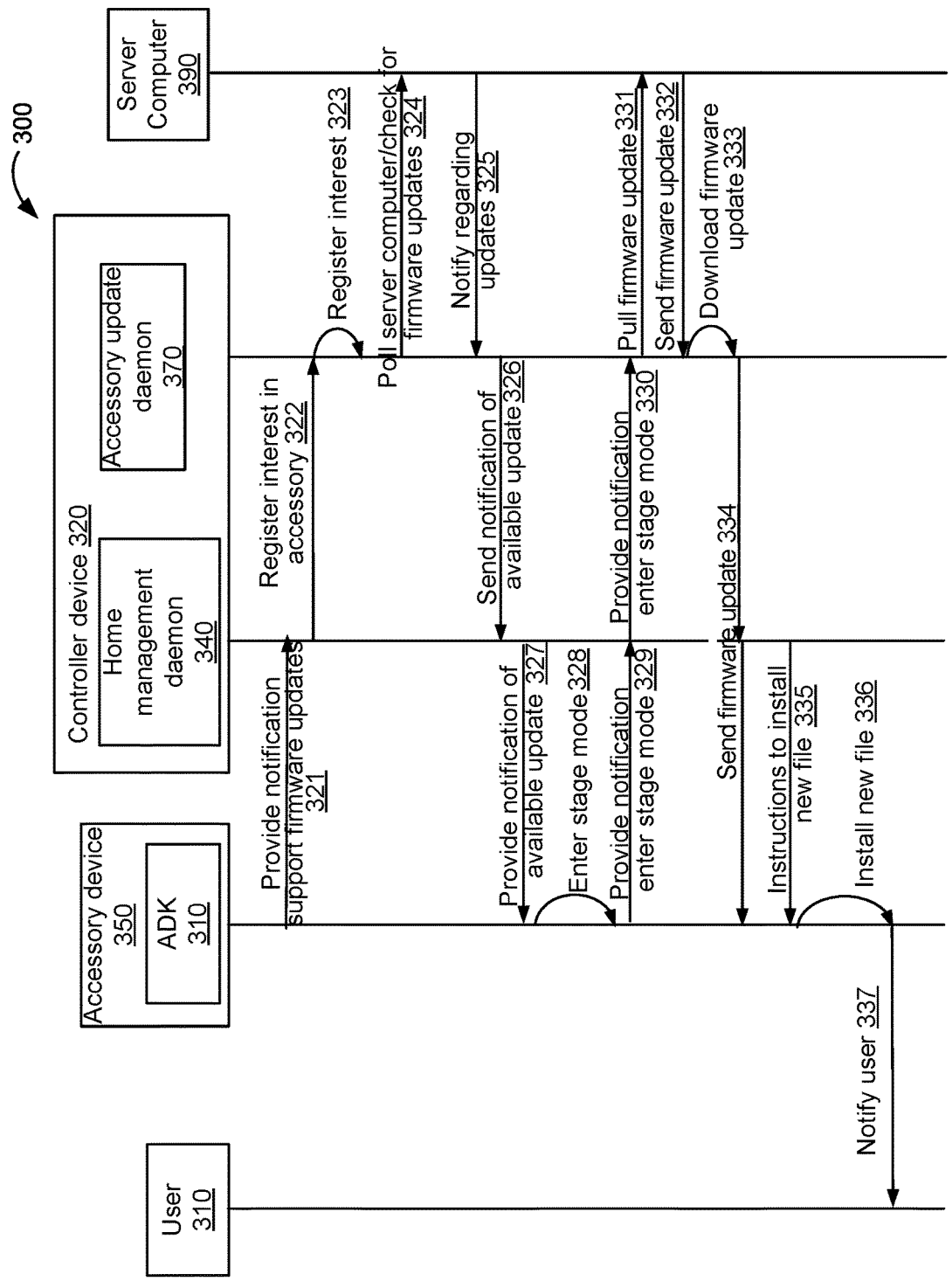
FIG. 3 illustrates a sequence diagram of a method for performing a firmware update, in accordance with some example embodiments.

FIG. 3 illustrates a sequence diagram of a method 300 for performing a firmware update, in accordance with some example embodiments. The example shown in FIG. 3 can apply to a manual firmware update or an automatic firmware update. A manual update is performed when a user manually selects to apply a firmware update. An automatic firmware update is when the firmware update is automatically applied without user intervention and/or based on policies (e.g., automatically generated policies, user-specified policies, pre-defined policies, or the like).

FIG. 3 discloses the interaction between a user 310, an accessory device 350, a home management daemon 340, an accessory update daemon 370, and a server computer 390. The home management daemon 340 and the accessory update daemon 370 can be located on a controller device 320. The accessory device 350 can include an accessory development kit 360. An accessory update service can be provided by the accessory update daemon, and a device management service can be provided by the home management daemon. The accessory update daemon can be located on the controller device 320 and can be continuously running on the controller device 320.

In the example shown in FIG. 3, the accessory device 350 is from a different manufacturer than the controller device 320. However, example embodiments can be applied to an accessory device that is from the same manufacturer as the controller device 320, but does not contain an application to perform firmware updates.

The user 310, accessory device 350, home management daemon 340, accessory update daemon 370, and server computer 390 of FIG. 3 can correspond to those shown in FIGS. 1 and 2. Although a particular sequence of steps are described, the order of the steps can vary.

At step 321, the accessory device 350 can notify the home management daemon 340 of a controller device 320 that the accessory device 350 can support firmware updates. The accessory device can advertise that it implements a full update service. The communication can be performed via a secure channel.

At step 322, the home management daemon 340 can register an interest in the accessory 350 with the accessory update daemon 370, by sending a request to the accessory update daemon 370. An accessory update service of the accessory update daemon 370 can receive the request to register an interest of the device management service in the accessory device.

The home application will register that interest to the accessory update daemon. The home management daemon will communicate with the accessory update daemon, and it will notify the accessory update daemon that they would like to register an interest in updates for the accessory device.

The home management daemon 340 can receive the interest to register the accessory from the home application. As described below with respect to FIGS. 7A and 7B, the user can use the user interface of the home application to configure the settings and register for accessory devices for which they are interested in receiving firmware updates.

The information that instructs the accessory update service to request the firmware update corresponds to the registered interest of the device management service.

At step 323, the accessory update service of the accessory update daemon 370 can register the interest of the device management service.

At step 324, the accessory update daemon 370 can poll server computer 390 for firmware updates. The accessory update daemon 370 can listen and poll the server for updates. Based on update policies, the accessory update daemon 370 will check for firmware updates for accessory 350 that home management daemon 340 has registered for. That is, the accessory update daemon 370 can poll the server computer 390 for firmware updates.

The accessory update daemon 370 can check for firmware updates based on the frequency of checks that were registered by the user. The accessory update service will check for updates daily, weekly, monthly, etc. based on the profile settings that have been configured by the user.

At step 325, the server computer 390 can notify the accessory update daemon of any firmware updates for the accessory device 350.

At step 326, the accessory update date 370 can send a notification to the home management daemon 340 that one or more firmware updates are available.

At step 327, the home management daemon can notify the accessory device 350 that an update is available.

At step 328 the accessory device can enter the stage mode. The accessory device can learn about the availability of the update and enter the stage mode for staging the update.

At step 329, the accessory device 350 can notify the home management daemon 340 that is has entered the stage mode. Specifically, the accessory development kit 360 can notify the home management daemon 340 that it has entered the stage mode. The accessory device can determine what is needed to stage the update and can provide a notification when it is ready.

The accessory development kit 360 of the accessory device 350 will enter a stage mode. Therefore, the accessory device 350 has been notified that is going to receive firmware. However, the accessory device 350 will not install the firmware until it is instructed to install the firmware. Therefore, in a stage mode, the accessory device is aware that it will receive a firmware update, but has not yet performed the firmware update.

At step 330, the home management daemon will provide notification to the accessory update daemon 370 that the accessory device 350 has entered the stage mode. Specifically, the home management daemon 340 can notify the accessory update daemon 370 that the accessory development kit 360 has entered the stage mode.

At step 331, the accessory update daemon 370 will request the firmware update from the server. That is, the accessory update daemon 370 can pull the firmware update from the server computer 390.

In the example shown in FIG. 3, the firmware update is pulled after the accessory device has indicated that it has entered the stage mode. However, in another embodiment, the accessory update daemon can pull the firmware update from the server computer 390 at the time that it performs a check for firmware updates.

At step 332, the server computer 390 can send the firmware update to the accessory update daemon 370. That is, the server computer 390 will send the firmware update to the accessory update daemon 370 based on the request for the firmware update.

At step 333, the accessory update daemon 370 can download the firmware updates. That is, the accessory update daemon 370 can download the firmware update from the server computer 390.

At step 334, the accessory update daemon 370 can send the firmware update to the home management daemon 340. The accessory update daemon 370 will use an interface for the secure channel of home management daemon 340 to send a firmware update to the home management daemon 340.

At step 335, the home management daemon 340 can send the firmware update and the instructions to install the new file to the accessory device. Step 335 can be at some point later in time. Based on a policy, home management daemon 340 will instruct the accessory development kit 360 to install the new file.

At step 336, the accessory device 350 can install the new file. The accessory development kit of the accessory device can install the new file. The accessory development kit can install any new firmware at the time that it is instructed to install the new file. Alternatively, a trickle feed system can be implemented for installing the new firmware. A method of providing a firmware update via a trickle feed system is explained in greater detail with respect to FIG. 9.

After installation of the new file, it can be determined whether the firmware update has succeeded or failed.

At step 337, the accessory device 350 can notify the user that the firmware has been updated. If the firmware update has succeeded the user can be notified the user can be notified that their accessory device has been updated. If the firmware update did not succeed, the user can be notified of any errors. The user can be notified via the home application.

The example shown in FIG. 3 is with respect to one third-party accessory device. However, firmware can be downloaded for accessory devices from various third party server computers. Therefore, a second firmware update can be received from a second server computer for a second third-party accessory device. A plurality of different server computers can provide firmware updates for accessory devices.

The accessory update service that is provided by the accessory update daemon enables the firmware of third-party accessory devices to be updated without requiring a third-party application to execute on the controller device.

In accordance with an example embodiment, an accessory will reject requests to apply a firmware update if the appropriate conditions to apply the update are not met. Further, the accessory will reject requests to start a firmware update process from another controller device, if the accessory is in the middle of performing a firmware update process from an initial controller device.

B. Method of Updating Firmware by a Controller Device

Figure 4:
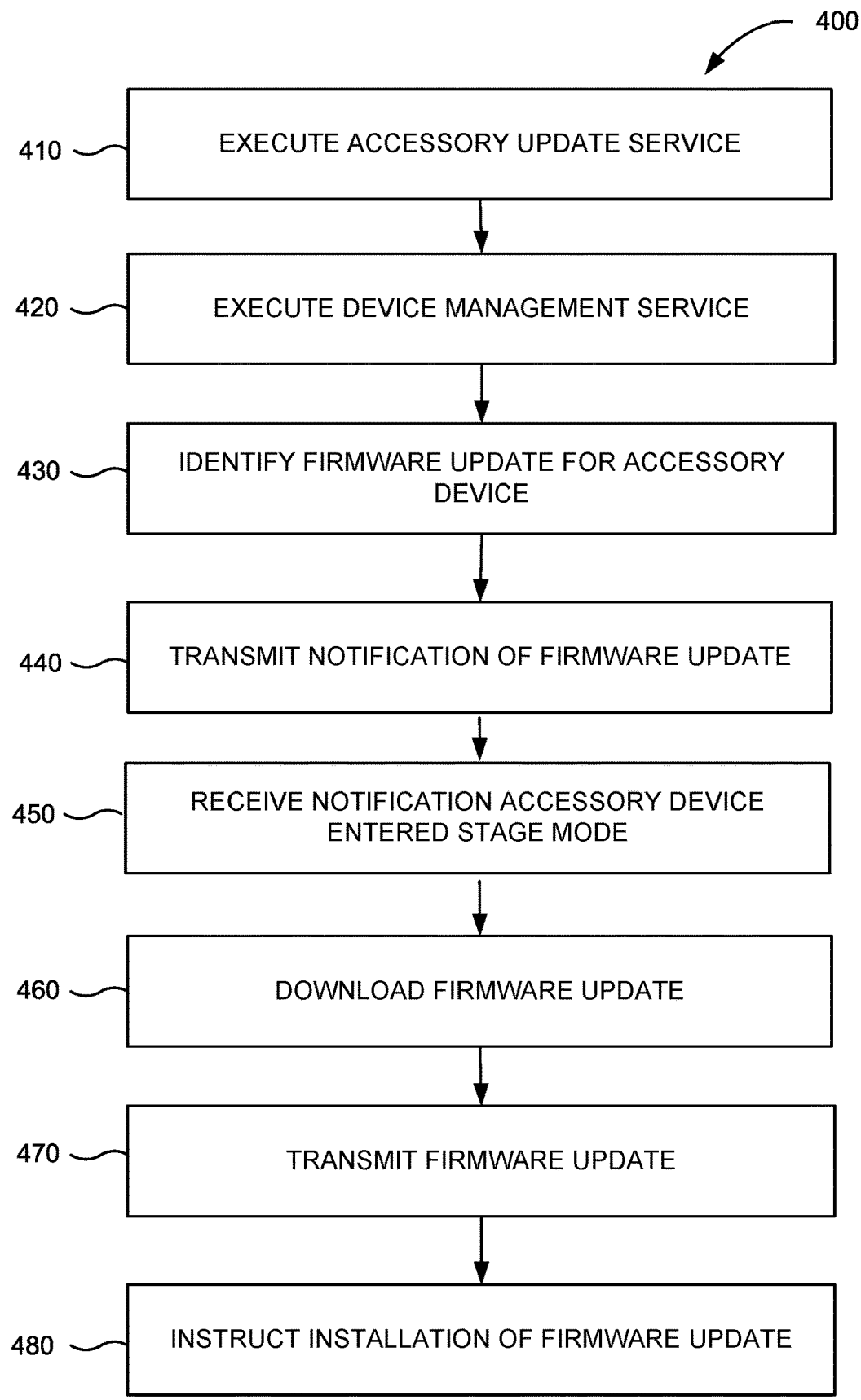
FIG. 4 illustrates a flowchart of a method for updating firmware for an accessory device, in accordance with some example embodiments.

FIG. 4 illustrates a flowchart of a method 400 for updating firmware for an accessory device, in accordance with some example embodiments. The example shown in FIG. 4 is from the perspective of the controller device, such as controller device 120 of FIG. 1 or controller device 220 of FIG. 2.

In the flowcharts described, the processes are illustrated as a logical flow diagram, each operation of which can represent one operation or a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes described herein.

In the example shown in FIG. 4, the accessory device is from a different manufacturer than the controller device. However, example embodiments can be applied to an accessory device that is from the same manufacturer as the controller device, but does not contain an application to perform its own updates. Further, the updating shown in FIG. 4 can occur when a manual update is performed. A manual update occurs when a user actively selects to apply an update.

At step 410, the controller device executes an accessory update service configured to enable firmware updates for an accessory device. The accessory update service can be performed by the accessory update daemon.

At step 420, the controller device executes a device management service for managing the accessory device. The device management service is configured to maintain a secure channel with the accessory device. The device management service can be performed by a home management daemon.

At step 430, an accessory update service of the controller device can determine that a firmware update for the accessory device is available on a server computer.

At step 440, the device management service can transmit a notice to the accessory device that a firmware update is available.

At step 450, the accessory update service receives a notification that the accessory device has entered the stage mode (e.g., a mode for staging the update). The notification can be sent from the accessory device to the device management service of the controller device and the device management service can send the notification to the accessory update service.

At step 460, the accessory update service of the controller device downloads the firmware update from the server computer for the accessory device.

At step 470, the accessory update service of the controller device transmits the firmware update to the accessory device via the secure channel maintained by the device management service.

At step 480, device management service of the controller device instructs the accessory device to install the firmware update. The accessory device can then install the firmware update.

C. AUD, Home Management Daemon, and Accessory Device Interaction

Figure 5:
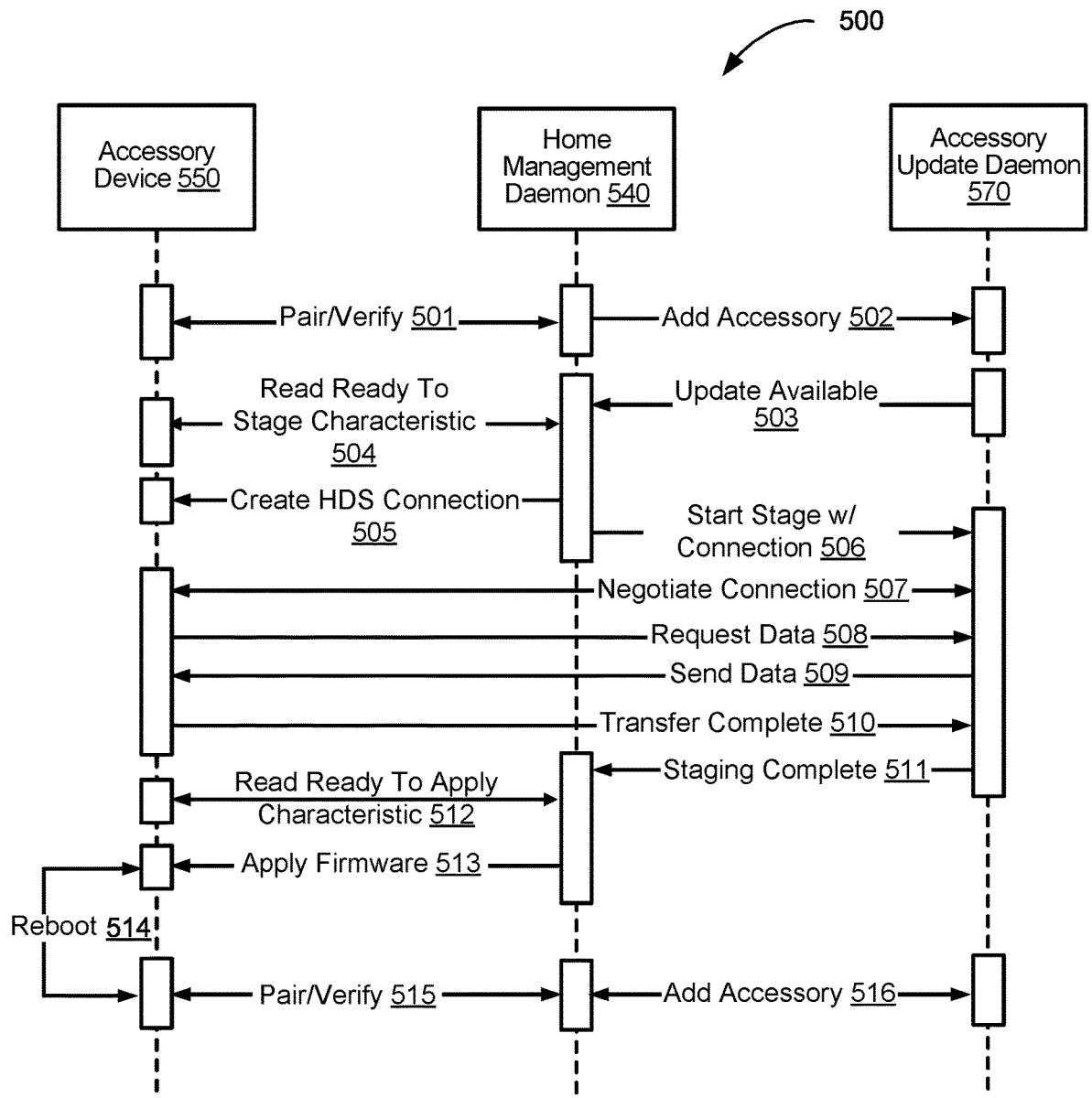
FIG. 5 illustrates a sequence diagram for updating firmware, in accordance with some example embodiments.

FIG. 5 illustrates a sequence diagram 500 for updating firmware, in accordance with some example embodiments. FIG. 5 illustrates the interaction between an accessory device 550, a home management daemon 540, and an accessory update daemon 570. Accessory device 550, home management daemon 540, and accessory update daemon 570 can correspond to the accessory device, the home management daemon, and the accessory update daemon shown in FIG. 1 and FIG. 2.

At step 501, an accessory device 550 can be paired with a home management daemon 540 of the controller device. At step 501, the pairing of the devices can also be verified. The home management daemon 540 can notify the accessory update daemon 570 that it would like to be notified if any updates are available for the accessory device 550.

At step 502, the home management daemon 540 can provide the accessory update daemon 570 with information for adding the accessory device 550 to the accessory update daemon 570.

At step 503, the accessory update daemon 570 determines whether or not there are any updates to the firmware available for the accessory device 550.

When it is determined that updates to the firmware are available, at step 504, the home management daemon 540 reads the ready to stage characteristic for the accessory device 550 and provides the information to the accessory device 550. The accessories can list their capabilities as characteristics. The controller can write to those characteristics to instruct the accessory on the state. A value can be can be sent from the accessory device 550 to the home management daemon 540 indicating that the accessory device is ready to stage. The home management daemon 540 can read the value and give a value back to the accessory device that is ready to stage.

At step 505, the home management daemon 540 creates an HTTP Dynamic Streaming (HDS) connection and sends the created connection to the accessory device 550. The connection can be used to securely communicate with accessory device.

At step 506, the home management daemon 540 notifies the accessory update daemon 570 to start the staging with the HDS connection that was created in step 505.

At step 507, a connection is negotiated between the accessory device 550 and the accessory update daemon 570.

At step 508, the accessory device 550 will request the firmware update data from the accessory update daemon 570.

At step 509, the accessory update daemon will send the requested data to the accessory device 550.

At step 510, the accessory device 550 will notify the accessory update daemon 570 when the transfer of the data is complete.

At step 511, the accessory update daemon 570 will confirm with the home management daemon 540 that the staging is complete.

At step 512, the home management daemon 540 reads the ready to apply characteristic for the accessory device 550 and provides the information to the accessory device 550.

At step 513, the home management daemon 540 applies the firmware update to the accessory device 550.

At step 514, the accessory device 550 can be rebooted so as to ensure proper installation of the firmware update.

The process can continue repeatedly with additional accessory devices being added. Therefore, as shown in step 515, another accessory device can be paired with the home management daemon and verification of repairing can be performed. When the pairing is successful at step 516, the accessory device can be added.

D. Transition Diagram

Figure 6:
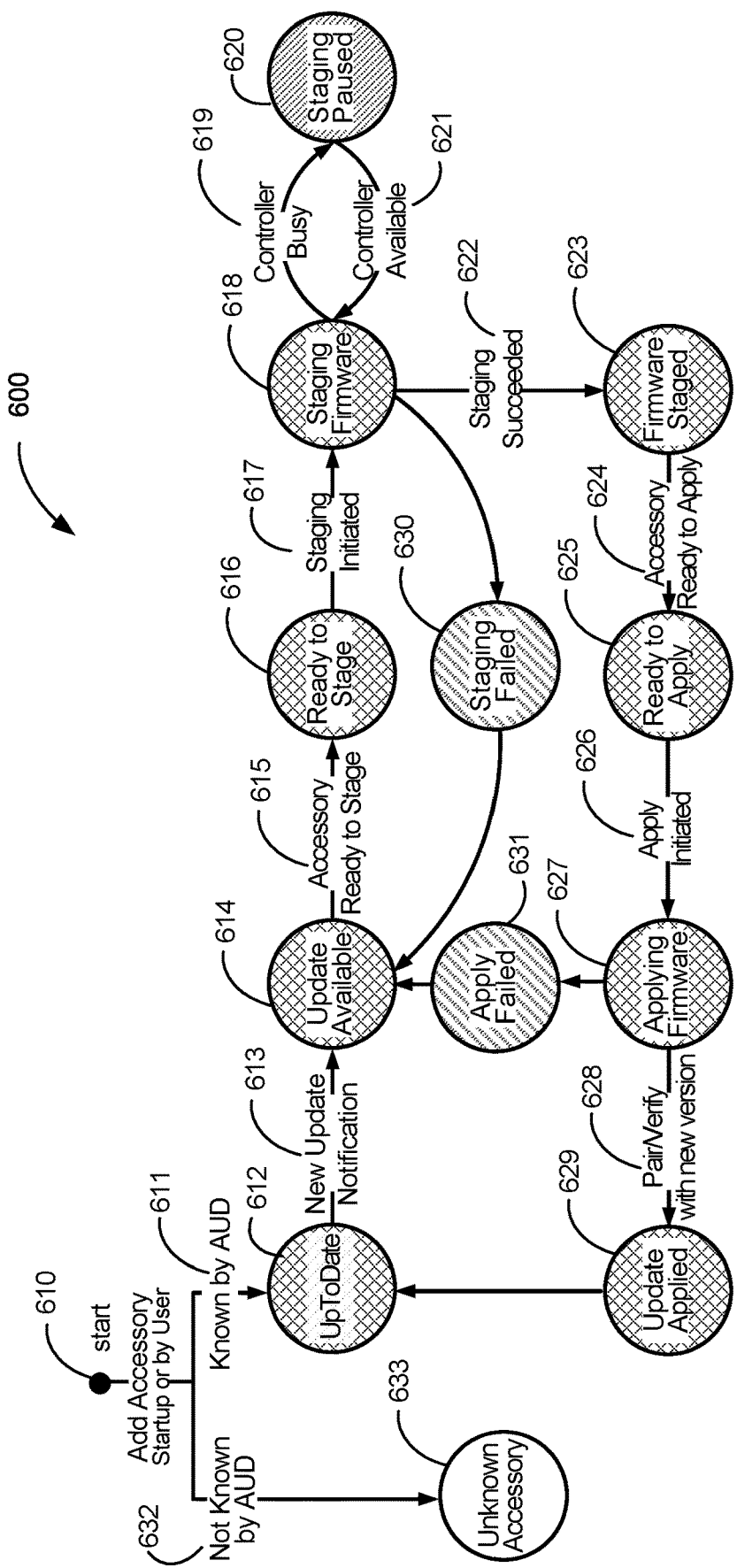
FIG. 6 illustrates a transition sequence diagram for updating firmware, in accordance with some example embodiments.

FIG. 6 illustrates a diagram of a transition sequence 600 for updating firmware, in accordance with some example embodiments. The accessory device, home management daemon, and accessory update daemon described with respect to FIG. 6 can correspond to those described in the figures above (e.g., FIGS. 1 and 2).

At step 610, the sequence is started when an accessory device is added. The accessory device can be added during startup or by a user. During starting of the home management daemon, all accessory devices in the home that can have firmware updated via the accessory update daemon can be registered with the accessory update daemon. When an accessory is removed from the home it can be unregistered from accessory update daemon At step 632 is determined whether an accessory update daemon knows the accessory device. If the accessory update daemon does not know the accessory device, at step 633, the accessory device is identified as an unknown accessory device. The accessory update daemon may not know the accessory device if it has not previously received information regarding the accessory device.

At step 611, it is determined whether the accessory update daemon knows the accessory device. If the accessory update daemon knows the accessory device, at step 612 is determined whether the accessory device is up-to-date.

The accessory will be notified by accessory update daemon when a firmware update is available. Relevant firmware update policies can be queried to see if the accessory device can be updated. If the accessory device can be updated, the staging process can be started. Otherwise, firmware update policies can be queried periodically to determine when an accessory device can be updated.

At step 613, a new update notification can be received. At step 614, is determined whether the update is available. At step 615, if the update is available, it can be determined whether the accessory device is ready to stage. At step 616, the accessory device can indicate that it is ready to stage.

At step 617, staging can be initiated. When staging begins, a connection with the accessory device can be created and handed off to a UARP controller.

At step 618, staging of the firmware can begin. If staging stops, the sending of data will stop and an HDS connection can be removed.

At step 619, if the controller device is busy, then at step 620, the staging is paused. When staging is paused, the sending of data stops. However, an HDS connection remains.

If at step 621, the controller is or becomes available, then the process can resume with staging the firmware.

At step 630, it can be determined that the staging has failed. If the staging has failed, then the process can return to step 614 and it is again determined whether or not an update is available.

At step 622, it is determined whether the staging was successful, the firmware can be staged.

At step 624 is determined whether the accessory device is ready to have the firmware update applied.

At step 625, it can be determined whether the accessory device is ready to have the firmware applied. An accessory device can be ready for the firmware update based on the state of the accessory device. Accessory readiness can also be determined by a policy object determined by the accessory class. It may be influenced by time of day, user presence, accessory state or other factors. Scheduling updates can be influenced by accessory readiness, system load (CPU, memory, network), connectivity, update flags (e.g., security update)

At step 626, application of the firmware is initiated.

At step 627, firmware can be applied to the accessory device. When the firmware is applied, an HDS session is created. The session is passed to an accessory update daemon to signal the accessory to update. Ownership and load balancing can also be updated.

At step 631, it can be determined that application of the firmware update has failed. If the application of the firmware update has failed, the process can return to step 614 and again determine whether or not an update is available.

At step 628, the accessory device can be paired with the new version of the firmware and it is verified that the accessory device has the new version.

At step 629, the updated firmware has been applied to the accessory device.

At step 612, after the updated firmware has been applied to the accessory device, it can be determined that the accessory device is now up to date. If the firmware is up to date, then the process can end. Otherwise, the process can be repeated if the firmware is not up to date.

III. User Configuration

The user can configure when and how they would like to receive firmware updates. The user can perform this configuration via a user interface of the home application.

A. User Interface

Figures 7A, 7B:
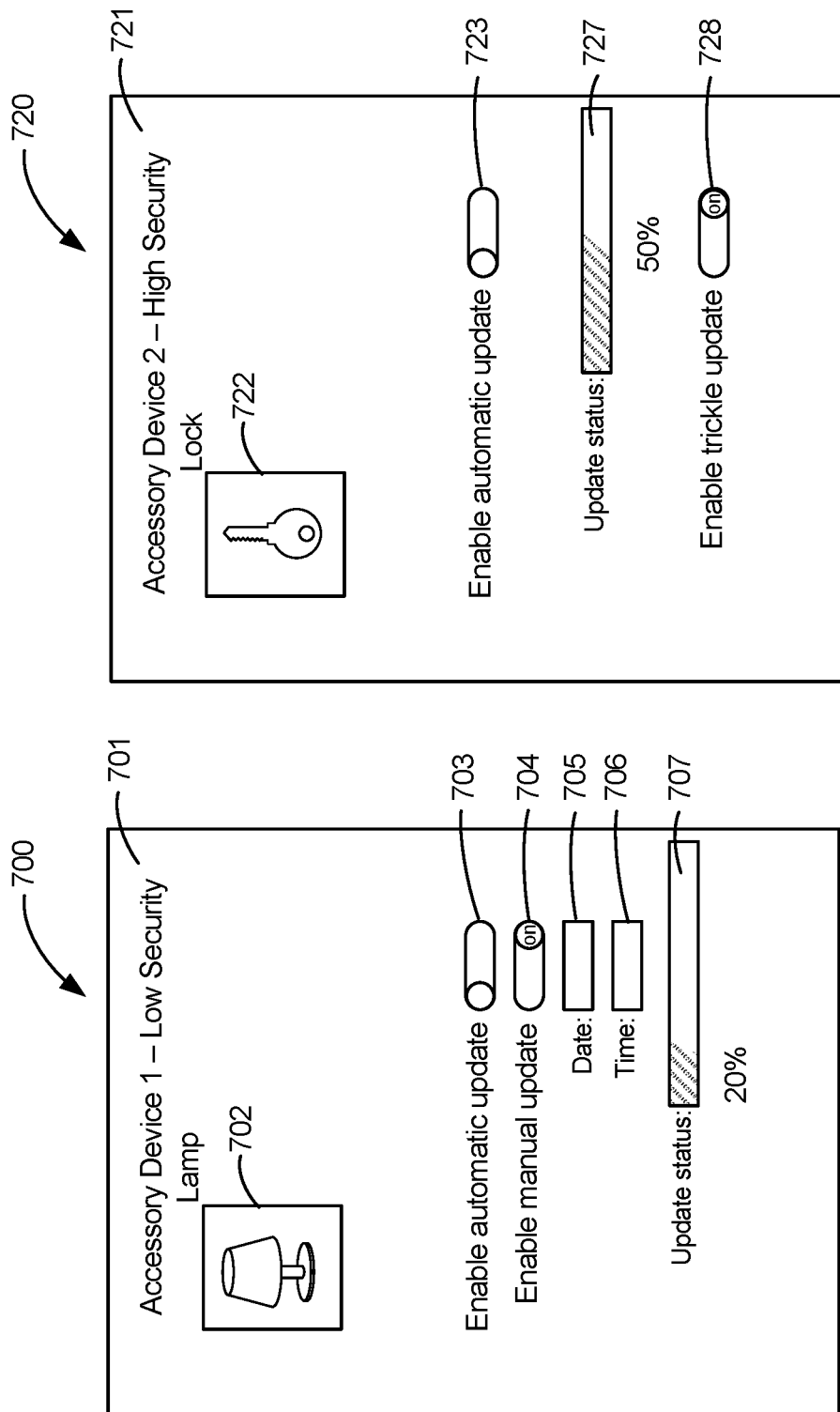
FIGS. 7A and 7B illustrate user interfaces for configuring firmware updates, in accordance with some example embodiments.

FIGS. 7A and 7B illustrate user interfaces 700 and 720 for configuring firmware updates, in accordance with some example embodiments. The configuration of the firmware updates can be performed on the home application that is stored on the controller device.

In the example shown in FIGS. 7A and 7B, a high-security device and a low-security device are shown. However, there can be different categories of devices that that shown in FIGS. 7A and 7B. A low security and a high-security category are described however, there can be different categories of devices. Further, the firmware update policies can vary based on the category of the device.

Low security accessory devices can include, for example, a light, an outlet, a switch, a fan, a stateless switch, an air quality sensor, a humidifier sensor, a motion sensor, an occupy sensor, a flood sensor, a thermostat, thermostat, an air conditioner, an air purifier, a humidifier, a WiFi Router, an IP Camera, a speaker, a sprinkler, a TV, a blind or shade, and a remote.

High-security accessory devices can include a CO sensor, CO2 sensor, smoke sensor, contact sensor, garage door, door lock, door, window, security system, and IP doorbell.

The categories of the devices can vary. In some instances a same type of device can be a high-security device and a low security device. For example, one IP camera in a home can be a low security device and another IP camera in the home can be a high-security device.

FIG. 7A illustrates a user interface 700 displaying a firmware configuration interface for a first accessory device. In the example shown in FIG. 7A, the first accessory device is a lamp 702. In the example shown in FIG. 7A, the lamp 702 is a Wi-Fi device. The user interface 700 also identifies the category type of the device. In the example shown in FIG. 7A, the lamp 702 belongs to a low security category.

In an example embodiment, additional options can be provided based on additional category information of the accessory device. The accessory device can be associated with an occupancy based update category, a dynamic update category, a multi-function category, a bridge update category, or a time based update category. Based on the update category of the accessory device, additional options can be provided on the user interface.

Since the lamp 702 is a low security device, the user can configure whether they would like to enable automatic updates or manual updates. If the accessory device was a high-security device, the user may be prevented from performing manual updates. Alternatively, high and low security devices can be enabled for manual updates.

If the user would like to enable automatic updates, the user can select button 703. The user can indicate that they would like the update to be performed automatically right now, or they can indicate that they would like the update to be performed automatically at a later time. If the user would like to perform the update at a later time, the user can enter a date and time for performing the update. The user can enter a date and time in a date and time field.

If the user would like to enable manual updates, the user can select button 704. For the manual update, the user can enter a date and time in the date field 705 and the time field 706. The user can indicate that they would like to perform the update manually right now or they can indicate that they would like to perform the update manually a later time. The user can be provided with a calendar so that the user can more easily enter the date information. The user can also be provided with a clock in order to enter the time information.

Firmware updates can be pulled from the server based on the type of updating (e.g., manual or automatic) selected by the user.

The configuration firmware interface also provides a firmware update status 707. The firmware update status 707 provides the user with information regarding the status of the update, such as what percent of the update has been completed and/or how much time is needed to complete the update. Therefore, the user can easily determine the current status of the firmware update.

FIG. 7B illustrates a user interface 720 displaying a firmware configuration interface for a second accessory device. In the example shown in FIG. 7B, the accessory device is a door lock 722. In the example shown in FIG. 7B, the lock 722 is a Bluetooth device. The user interface 720 also identifies the category type of the device. In the example shown in FIG. 7B, the door lock 722 belongs to a high security category.

Since the door lock 722 belongs to a high-security category, manual updating of the firmware is limited. This is to prevent the user from modifying firmware updates that may be needed in order for the door lock to operate securely. Therefore, in the example shown in FIG. 7B, the user only has the option to enable automatic updates. The configuration options provided to the user can vary depending on, for example, the location of the lock, and the policies associated with the accessory device. The manual configuration of the firmware update can be limited so as to ensure that the accessory device continues to operate normally.

If the user would like to enable automatic updates, the user can select button 723. The user can indicate that they would like the update to be performed automatically right now, or they can indicate that they would like the update to be performed automatically at a later time. If the user would like to perform the update at a later time, the user can enter a date and time for performing the update. The user can be provided with a calendar so that the user can more easily enter the date information. The user can also be provided with a clock in order to enter the time information.

The firmware configuration interface also provides a firmware update status 727. The firmware update status 727 provides the user with information regarding the status of the update, such as what percent of the update has been completed and/or how much time is needed to complete the update. Therefore, the user can easily determine the current status of the firmware update.

The firmware configuration interface shown in FIG. 7B, also provides the user with an option to enable trickle feed. The user can enable the trickle feed by selecting the trickle feed button 728. A trickle feed allows the user to update firmware at a desired rate.

If the user selects the trickle feed option, updates to firmware for that particular accessory device can be provided over time so as to minimize the accessory device interruption to the user. The method of providing the firmware update via a trickle field is explained in greater detail with respect to FIG. 9. In some instances, even though the trickle field option is enabled, a trickle feed may not be needed as the firmware can be updated within a few seconds or minutes.

The views that shown in FIGS. 7A and 7B, are simplified views of a user interface. Various other options can be provided based on the policies associated with updating the firmware for the particular accessory device.

For example, different types of accessory devices may require different security features. For example, if accessory device is a lightbulb than the user may be allowed to manually configure the firmware as desired. However, for the accessory devices that require greater security, such as a lock, security system, camera, etc. the user may be limited in the firmware updates that the user can configure.

The user's desired configuration settings can be provided by the home application, on which the user has configure the profile for an accessory device, to the home management daemon. Home management daemon can then provide the configuration settings to the accessory update daemon. Therefore, the user has registered an interest in updates for a particular accessory.

Although not shown, a user can also indicate whether they would like to be notified when a firmware update is complete. Various configurations can be performed based on the type of device.

The user can easily configure when they would like firmware updates to occur for particular accessory devices. The configuration can be set to default settings based on the type of the device. Further, the user can configure the updates based on the category of the device.

Therefore, in accordance with example embodiments, accessory devices can be easily configured to support an accessory firmware update.

B. Method of Implementing Device Configuration

Figure 8:
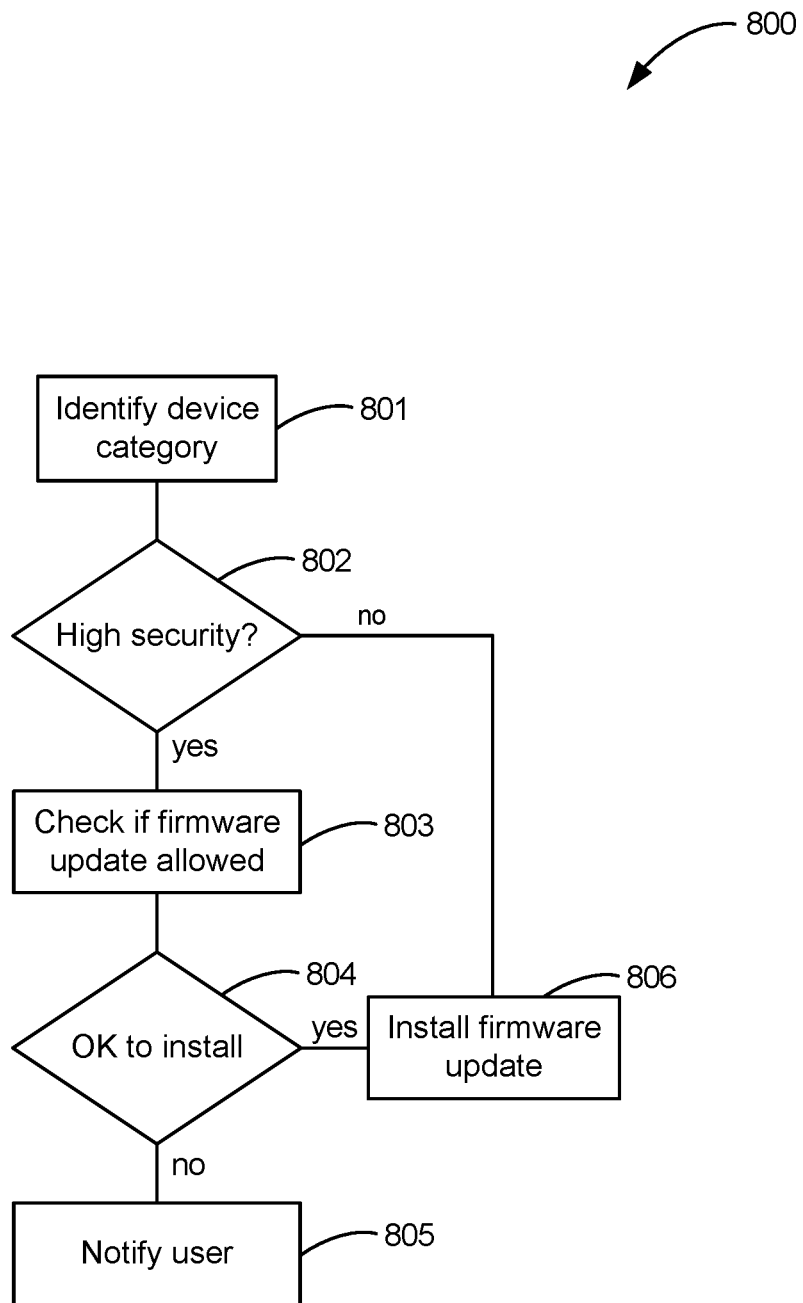
FIG. 8 illustrates a method of implementing a firmware update based on a category of the accessory device, in accordance with some example embodiments.

FIG. 8 illustrates a method 800 of implementing a firmware update based on the category of the accessory device, in accordance with some example embodiments. In the example shown in FIG. 8, the categories include a high-security device and a low-security device. However, these are merely examples and the categories and the policies associated with the categories can vary.

A policy can be implemented based on the category type of the device. A policy identifies the types of firmware updates that are allowed for a particular accessory device and the rules for updating the firmware. For example, high-security devices may have more restrictive policies than low-security devices.

At step 801, a category of an accessory device is determined. The home application can identify a category of the device. The category can be identified in the policy for the accessory device.

At step 802, it can be determined whether the accessory device is a high-security device. If, at step 802, it is determined that the accessory device is not a high-security device (e.g., is a low security device), it can determined that all firmware updates can be applied to such devices. Therefore, the method can proceed to step 806, and the firmware update can be installed.

If, at step 802, it is determined that the accessory device is a high-security device, at step 803, a check is performed to determine whether the firmware update can be installed for the particular accessory device.

At step 804, if it is determined that installation of the firmware update is allowed, then the method proceeds to step 806 and the firmware update is installed.

If, at step 804, it is determined that installation of the firmware update is not allowed, at step 805, the user can be notified that the firmware update was not performed. Further, the user can be notified that an update is available, but it was not installed on the accessory device.

Therefore, as shown in FIG. 8, application of firmware updates can vary based on the category of the device and its associated policies. The method shown in FIG. 8 can be used in combination with the methods described above.

C. Trickle Feed Method

As shown in FIG. 7B, the user interface provides the user with an option to enable trickle feed. Trickle feed can be performed by the trickle feed updating system 121 shown in FIG. 1. The trickle feed updating can be applied to accessory devices that may require a greater amount of time in order to update firmware and/or for accessory devices that may have delays in the speed rate of downloading updates.

In order to perform a firmware update, an accessory device may need to be in proximity of the controller device. Further, while the firmware of the accessory device is being updated, both the controller device and the accessory device may be made unusable so as to ensure that the firmware is updated correctly. Depending on the type of firmware update, the controller device and/or the accessory device may be made unavailable for several minutes or even hours.

Many users may not want to be physically located with the accessory device while the firmware update is being performed. For example, it can be very inconvenient to the user to perform a lock firmware update while the user is standing outside their front door. Further, the user may not want to be inconvenienced by having the controller device and/or the accessory device being made unavailable for long periods of time. Therefore, an example embodiment provides for firmware updates that can be performed gradually over time, based on the needs of the user, instead of during a single instance. Trickle updates can be performed throughout the day, a week, or month.

By implementing a trickle feed updating system, errors will not result if the entire firmware update is not completed at a single time. That is because the update is performed gradually over time.

When trickle feed is in enabled, the home application can notify the user that an update is available prior to performing the firmware update. For example, if the home application determines that the user is actively using the accessory, then updating of the firmware will not be performed at that time. If it is determined that the user is not using the accessory device, the home application can notify the user that it would like to perform a firmware update.

During the times that the user is not using the accessory device, the home application can install part of the firmware update. A user is not required to wait for a long period of time for the firmware update to be completed. Instead, the firmware update is performed gradually over time when it is determined that the user is not using the accessory device. Therefore, the user is not inconvenienced during the firmware update process.

The user can indicate when they would like to start and stop the updating until eventually the updating is complete. For example, the user can indicate that date(s) and time(s) they would like to trickle feed update to be performed.

Alternatively, the controller device can independently determine when the user is not using the accessory device and that the user is near the accessory device to be updated. The user can be notified each time the controller device would like to initiate or resume the trickle feed updating.

Figure 9:
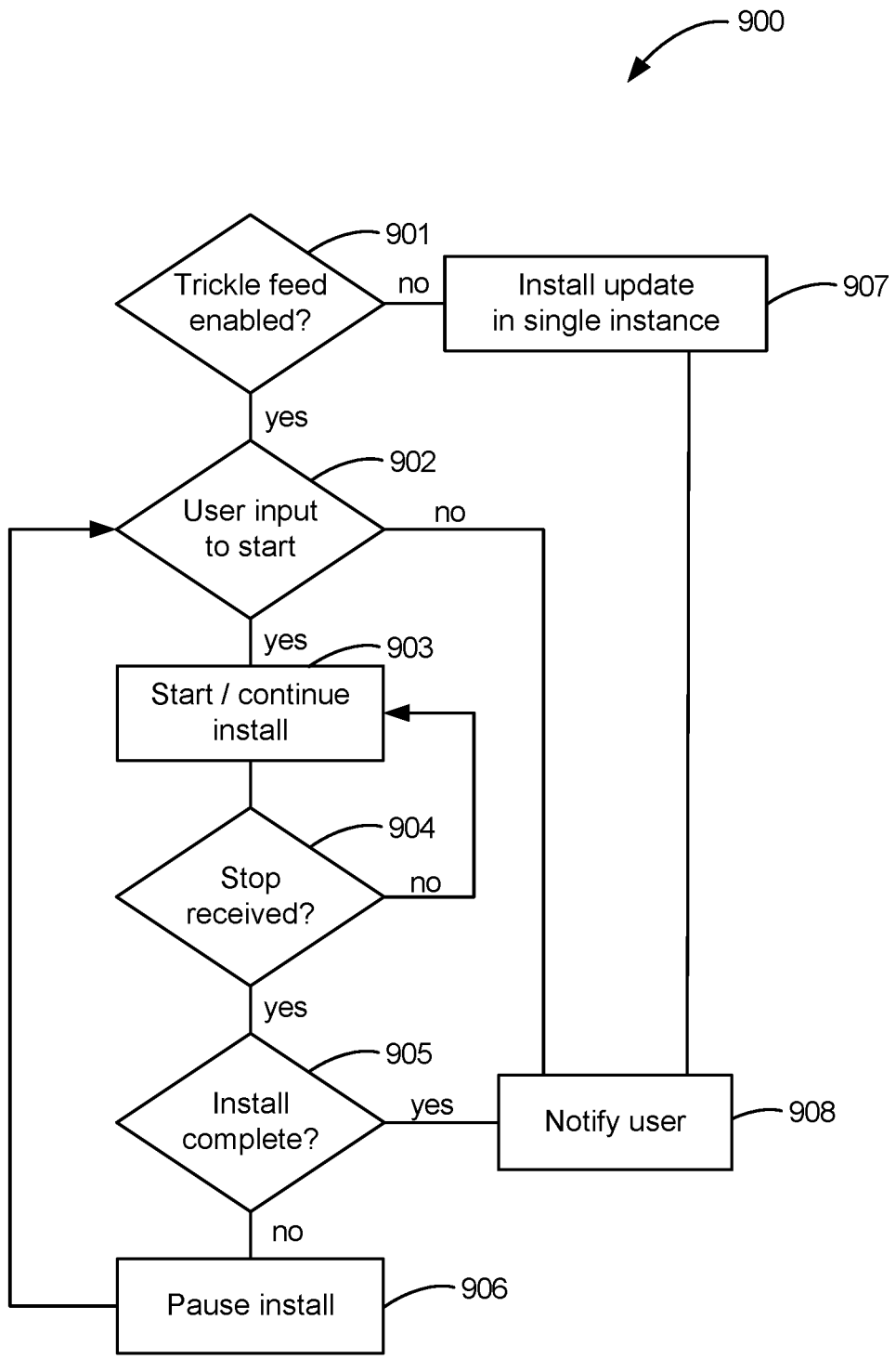
FIG. 9 is a flowchart of a method for performing a trickle feed firmware update, in accordance with some example embodiments.

FIG. 9 is a flowchart of a method 900 for performing a trickle feed firmware update, in accordance with some example embodiments.

If a device needs to install a firmware update, at step 901, is determined whether the user has enabled the trickle feed option for the particular accessory device. The user can enable the trickle feed option via the user interface as shown in, for example, FIG. 7B.

If the user has not enabled trickle feed option, at step 907, the firmware update can be performed in a single instance. At step 908, the user can be notified after the installation is complete.

If the user has enabled the trickle feed option, the method can proceed to step 902. At step 902, it is determined whether the user would like to perform updating at that time. For example, the user can be prompted to confirm that the trickle feed process can be performed. Alternatively, it can be determined that the user has enabled the trickle feed option to be performed whenever the accessory device and the controller device are within proximity of each other and the user has not used the controller device and the accessory device with a predetermined period of time (e.g. 5 minutes).

At step 903, after it has been determined that the user would like to perform the updating at that time, the firmware update can start.

At step 904, it is determined whether an indication to stop the installation is received. The indication may be a user selecting a button to stop the updating of the firmware. Alternatively, the indication may be the expiration of the predetermined amount of time allotted for that firmware update at that time.

If at step 904, there is no indication to stop the installation, the method continues to install the firmware update at step 903.

If at step 904, there is an indication to stop the installation, at step 905 is determined whether installation of the firmware update was complete. If it is determined that the firmware update installation is complete, at step 908, the user can be notified that installation is complete.

If at step 905, it is determined that the installation is not complete, at step 906, installation of the firmware update is paused. The user can also be notified regarding the amount of time remaining for the installation. The method proceeds to step 902, where it waits for user input to resume the firmware update. The method repeats steps 902, 903, 904, 905 and 906 until installation of the firmware update is complete.

Therefore, the user can manage the installation of updates for their accessory devices and can determine when they would like to perform firmware updates.

Alternatively, the controller device may be configured to independently determine when the update should be performed. The controller device can include a location identifying mechanism that can identify a current location of the user. Therefore, if the controller device determines that the user is on their way home, then the controller device will delay the updating of the firmware.

IV. Policies

The home management daemon provides the coordination of firmware updates in accordance with the user configuration and policies of the accessory device.

The policies can be very simple or very complex. The policies will be used to perform the firmware update. For example, if a wearable device has a firmware update, its policy could merely require a Wi-Fi connection. The policies will determine when it is appropriate for a particular category of an accessory device to be updated. Further, the policies will determine when the user will be allowed to manually configure the firmware update or when the user will be prohibited from manually configuring a firmware update.

In order to automatically apply firmware updates to an accessory device, the accessory device to be updated should be in a condition to perform the update. For example, the accessory device should indicate that it is ready to apply the staged update or the controller device can obtain the needed information from the accessory device. An accessory device can be available to apply an update if it has sufficient processing capacity to perform the update. Processing capacity can include memory and/or power (e.g., battery power) for applying the update.

Further, prior to installing the update, it should be determined that there are no other updates scheduled for the same accessory device that can interfere with the installing of the update. A plurality of firmware updates can be performed at a same time, however, it can be determined whether concurrent updates will cause a conflict.

Further, in order to apply the firmware updates, the auto-install policies for the different services provided by the accessory device should be met in order to ensure that the update is performed correctly.

In the example embodiments, the updating of the accessory device is performed automatically by the controller device without user intervention. Thus, the updates can be performed without interrupting the user experience.

A. Policy Subsystem

Figure 11:
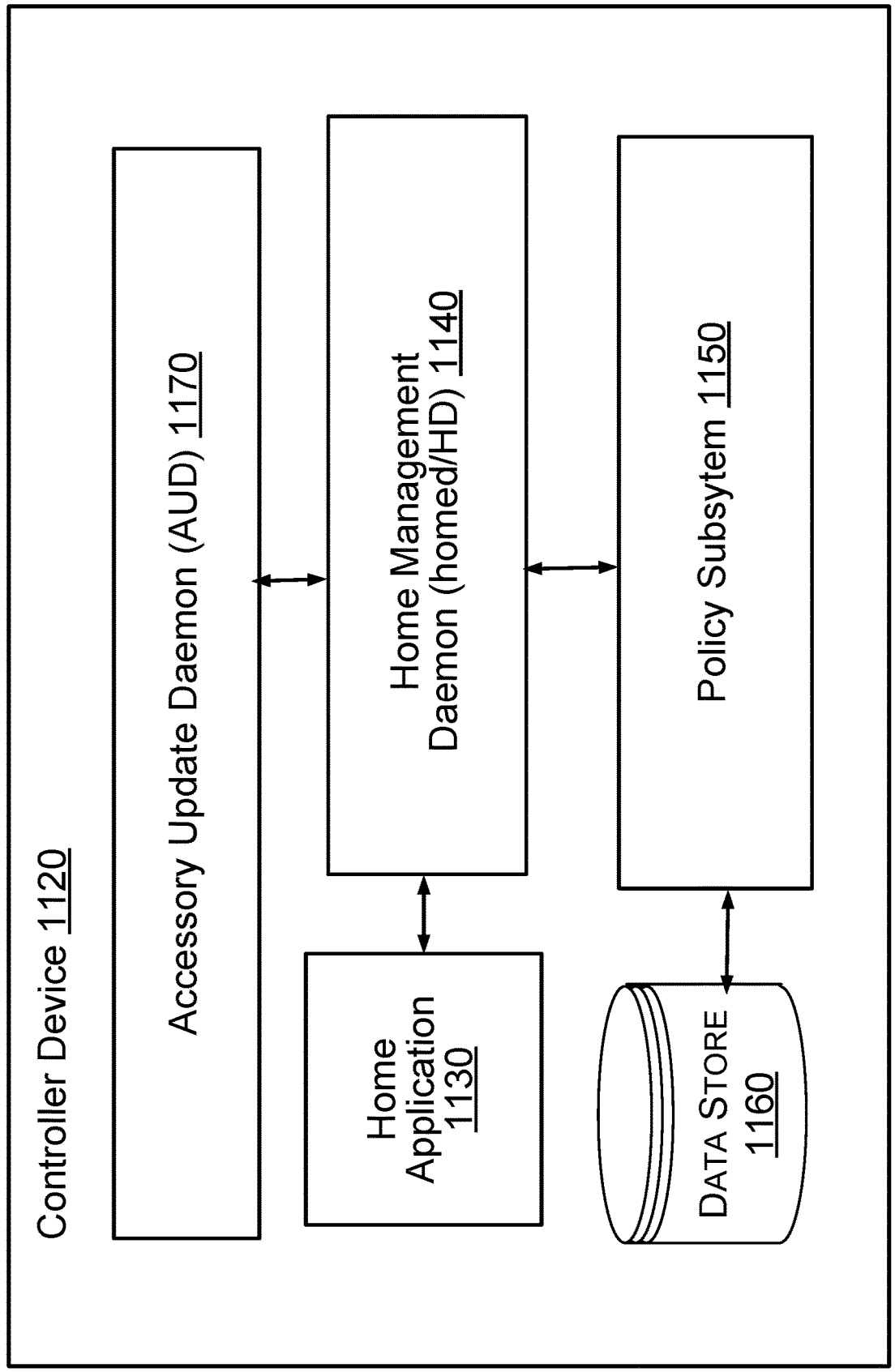
FIG. 11 illustrates controller device including a policy subsystem, in accordance with some example embodiments.

FIG. 11 illustrates controller device 1120 including a policy subsystem 1130, in accordance with some example embodiments. The controller device shown in FIG. 11 can be used to apply firmware updates in accordance with policies associated with the accessory devices. The controller device 1120 can include home application 1130, home management daemon 1140, policy subsystem 1150 and data store 1160. The controller device 1120 can correspond to the controller device shown in FIGS. 1 and 2. Further, home application 1130 and home management daemon 1140 can correspond to the home application and home management daemon shown in FIGS. 1 and 2.

The controller device 1120 includes the policy subsystem 1130. The policy subsystem 1130 can be used to determine the policies that are applicable to an accessory device. The policies can also be known as rules. The rules associated with an accessory device can be obtained from a server computer, such as server computer 190 shown in FIG. 1. The rules associated with accessory devices can be locally stored in data store 1140.

B. Overview of Method for Updating Accessory Device

Figure 12:
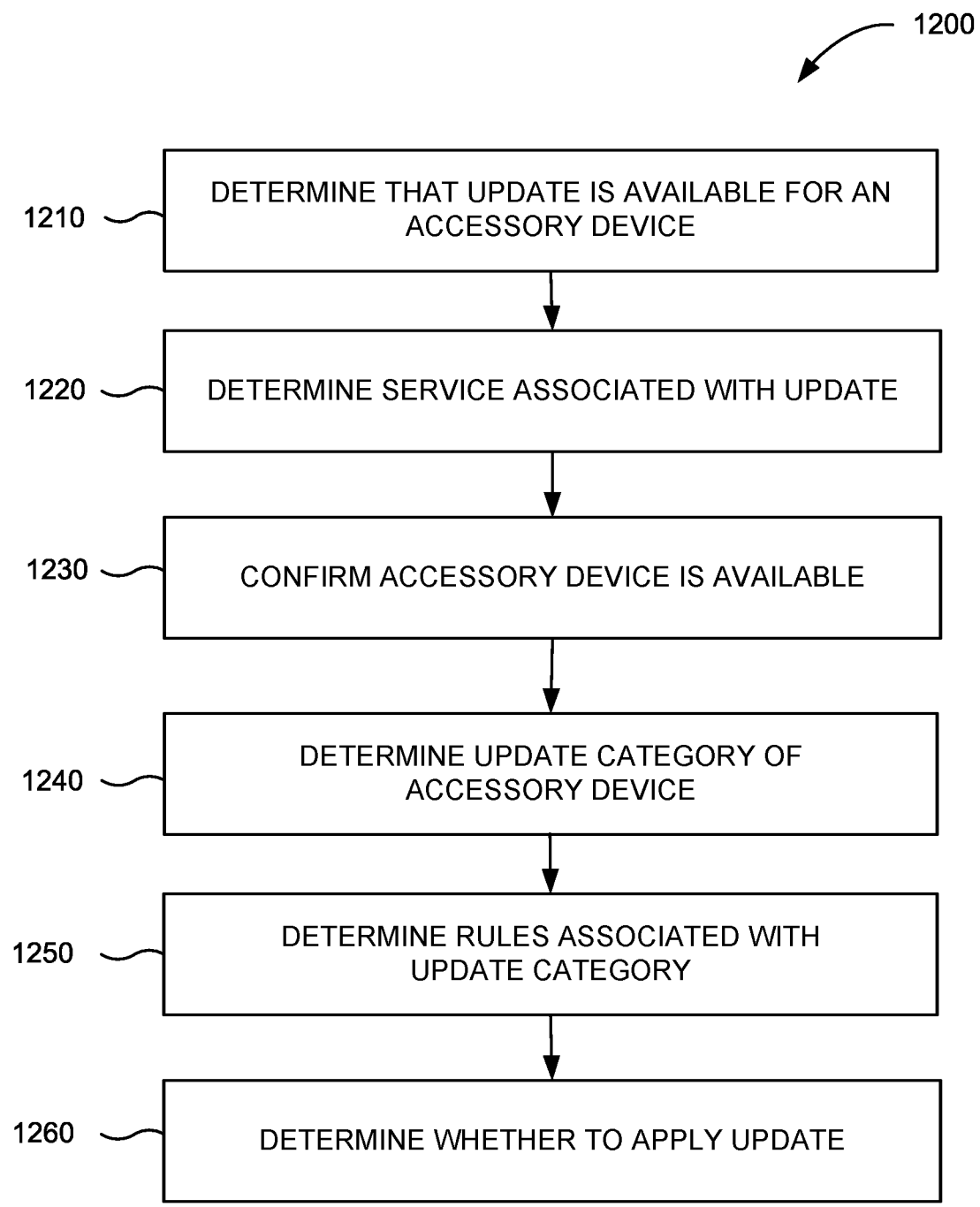
FIG. 12 illustrates a flowchart of a method for automatically updating the firmware of an accessory device, in accordance with some example embodiments.

FIG. 12 illustrates a flowchart of a method 1200 for automatically updating the firmware of an accessory device, in accordance with some example embodiments. FIG. 12 provides an overview of an example method. A more detailed explanation is provided with respect to FIGS. 13-18.

At step 1210, the controller device can determine that an update is available for an accessory device in an automated environment. The automated environment can include a plurality of accessory devices in, for example, a user's home.

At step 1220, a service associated with the update is determined. An accessory device can provide one or more services. For example, a motion sensor can provide a motion detecting service. A speaker can provide a speaker service, such as providing sound. In some instances, an accessory device can provide more than one service. For example, a ceiling fan may be able to provide a light service in addition to a fan service.

At step 1230, the controller device confirms that the accessory device is available for applying the update. The controller device can confirm that the accessory device is available for applying the update by communicating with the accessory device.

The controller device can determine that the accessory device is available to apply an update if, for example, the accessory device is not already scheduled to perform an update at the same time. Further, an accessory device may not be able to perform an update if the update will interfere with an operation of the accessory device. For example, if an accessory device is in use at the time that the controller device would like to apply the update.

At step 1240, in response to determining that the accessory device is available for applying the update, the controller device can determine an update category of the accessory device for which the update is to be applied.

Determining the update category of the accessory device can include determining whether the update category of the accessory device is an occupancy based update category, a dynamic update category, a multi-function category, a bridge update category, or a time based update category. Determining the update category of the accessory device can also include determining whether the accessory device is a high security or low security device.

At step 1250, the controller device can determine one or more rules associated with the update category of the accessory device. The one or more rules associated with the update category of the accessory device can correspond to the policies associated with the different categories of accessory devices.

The one or more rules associated with the update category of the accessory device can vary depending on whether a resident device exists in the home. A resident device can also be known as a resident controller device. A resident device can include a device that is resident in the automated environment, such as a home hub. A resident device can include, for example, a tablet, a computer, or a set top box that can communicate with accessory devices in the automated environment.

If there is a resident device, additional information associated with the accessory device can be obtained. The resident device can determine whether someone is in the home or not, can determine whether a room in a home is occupied, and can determine whether motion is detected. The resident device can obtain such information from accessory devices throughout the home. Therefore, the rules for applying a firmware update can vary depending on whether there is a resident device, since a resident device can provide additional and/or alternative information to the controller device.

At step 1260, the controller device can determine whether the update should be applied. The controller device cause the update to be applied to the accessory device based at least in part on one or more rules associated with the update category of the accessory device. Alternatively, the controller device can determines that the rules are not satisfied and the update should not be applied.

The application of the update based on one or more rules associated with the update category of the accessory device is described in greater detail with respect to FIGS. 13-18 below.

C. Occupancy Based Update via Controller Device

High security devices may often require that occupancy rules be met before applying an update. Due to possible security issues if an update were to fail, a high security device may require that a user be in the home before performing the update. If any issues are to occur, the user can be notified to correct the issue. Therefore, high security devices are examples of accessory devices that are of the occupancy based update category.

Figure 13:
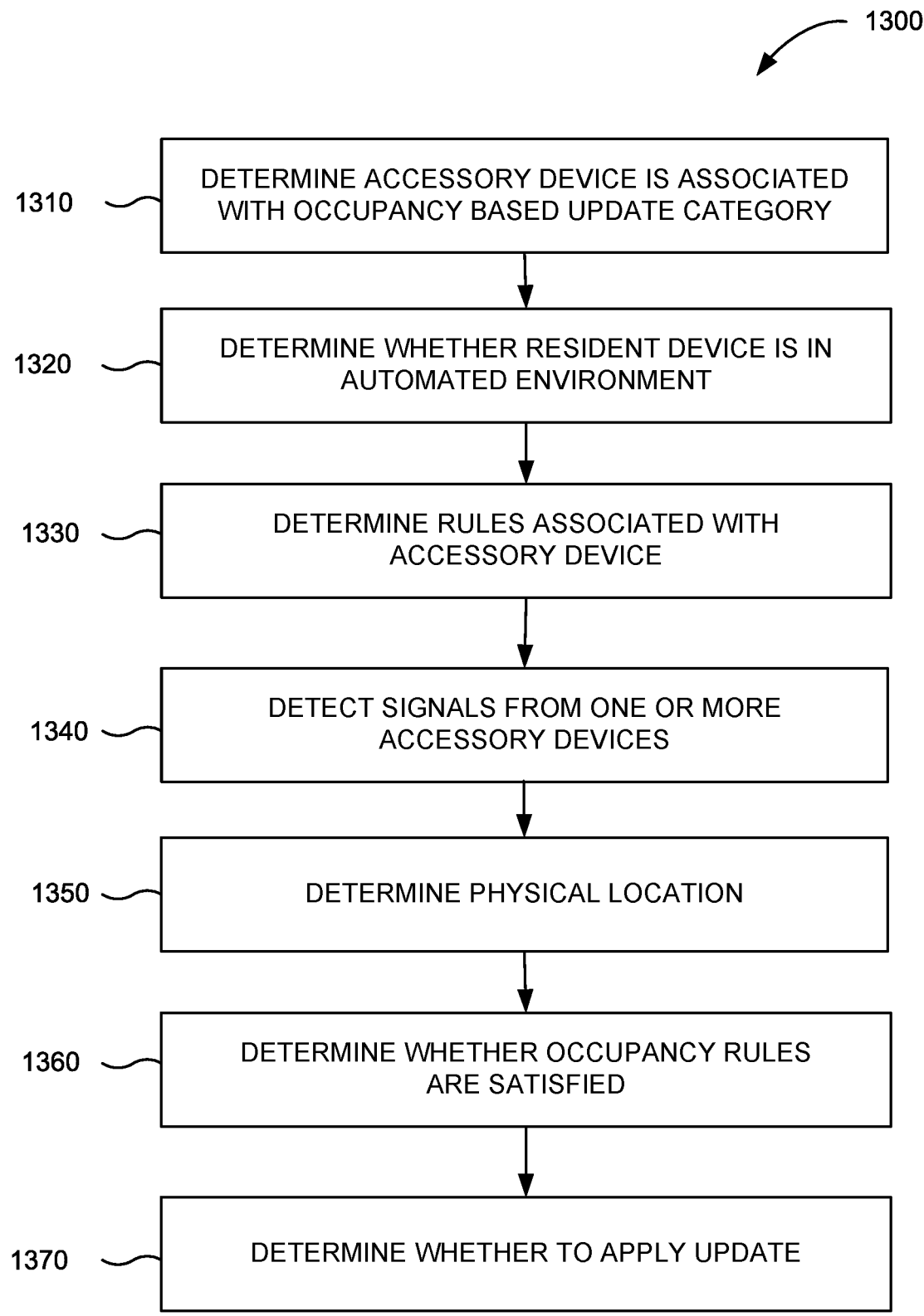
FIG. 13 illustrates a flowchart of a method for applying an update to an accessory device associated with the occupancy based update category, in accordance with some example embodiments.

FIG. 13 illustrates a flowchart of a method 1300 for applying an update to an accessory device associated with the occupancy based update category, in accordance with some example embodiments. An accessory device associated with the occupancy based update category includes rules that are based on occupancy. That is, firmware updates will be based on whether or not a user is in the home.

In the example described, a user is a registered user of the automated environment. The user is authorized to control one or more accessory devices in the automated environment. There may be a plurality of different users and each user may have one or more user devices for controlling accessory devices within an automated environments. Further, the accessory devices that can be controlled by the user can vary depending on the rights on the user.

At step 1310, the controller device can determine that an accessory device to be updated is associated with the occupancy based update category. The controller device an determine an update category of the accessory device by obtaining the information from the accessory device or based on predetermined information provided to the controller device regarding the accessory device.

At step 1320, it is determined whether there is a resident device in the automated environment. Although determining whether there is a resident device is described with respect to step 1320, the determination as to the existence of the resident device in the automated environment can be performed at any point so long as the rules to be applied can be determined. The rules for an accessory device can vary depending on the existence of a resident device in the automated environment.

At step 1330, the rules for applying the update to the accessory device are determined. The rules for applying the update can be based on whether there is a resident device in the automated environment. If a resident device is available in the automated environment, a first set of rules can be applied for updating the accessory device. If a resident device is not available in the automated environment, then a second set of rules can be applied for updating the accessory device. Occupancy based rules can include applying an update to an accessory device when the home is occupied or not applying an update to an accessory device when a home is occupied. The occupancy rules can vary depending on the type of accessory device.

At step 1340, the controller device can detect signals from one or more accessory devices in the automated environment. The controller device detects signal data from other accessory devices in the automated environment in order to determine that a physical location associated with the automated environment (e.g., home of the user) is or is not occupied.

At step 1350, the controller device can determine whether a physical location associated with the one or more accessory devices is or is not occupied. For example, the controller device can receive the signal from an accessory device, such as a TV, and the signal can indicate that the TV is on. As another example, the controller device can receive a signal from light accessory devices throughout the home, and the light accessory devices can indicate that they are on. The controller device can determine based on the signals received from accessory devices in the automated environment that since the devices are on and there is activity with the accessory devices, it is likely that the home is currently occupied. In the alternative, if the signal data from the accessory devices indicate that they are not being used and/or there is no activity with the accessory devices, then it is likely that the home is not currently occupied.

At step 1360, the controller device determines whether the occupancy rules for applying the update are satisfied. For example, an occupancy rule may include installing an update if the home is currently not occupied, or if the home has not been occupied for a predetermined period of time. In the alternative, an occupancy rule may include installing an update if the home is currently occupied.

At step 1370, the update can be applied to the accessory device in response to determining that the occupancy rules are met. For example, if an accessory device indicates that the home should be occupied before installing an update, and it is determined that the home is occupied, then the update can be installed.

If an accessory device indicates that the home should be occupied before installing an update, and it is determined that the home is not occupied, then the update will not be installed. If the rules are not met, then the controller device will not apply the update. The controller device can attempt to apply the update at another time, or the controller device can notify the user that attempts to apply an update was not successful.

D. Occupancy Based Update via Resident Device

As indicated above, a resident device can include a device that is resident in the automated environment. For example, a hub (e.g., Apple TV) can act as a resident device. The resident device remains within the home of the user. The resident device can communicate with the accessory devices that are in an automated environment. Therefore, the resident device can be used to obtain information regarding the activity of accessory devices and of users within the automated environment.

In some instances, a controller device may not be in a home. For example, a registered user of the automated environment may not be at home. Therefore, the controller device cannot be used to determine whether the home is occupied. In some cases, a home may be occupied even though a controller device is not located in the home. For example, a guest may be staying in the home. The guest may not be a registered user of the automated environment. Therefore, information regarding guest activity cannot be obtained by a controller device.

It would not be desired to perform an update if there is a person in the home. For example, it may not be desired to shut off accessory devices if there is a person in the home using the accessory device or updating the accessory device could affect the person in the home. For example, it would not be desired to update a lock, if such an update would prohibit the guest from entering or leaving the home.

Information regarding the guest cannot be obtained via a controller device if a guest is not a registered user of the automated environment. Therefore, in an example embodiment, a resident device can be used to determine occupancy. A resident device can be obtain signal data from a plurality of accessory devices in the home and determine whether the home is occupied.

Figure 14:
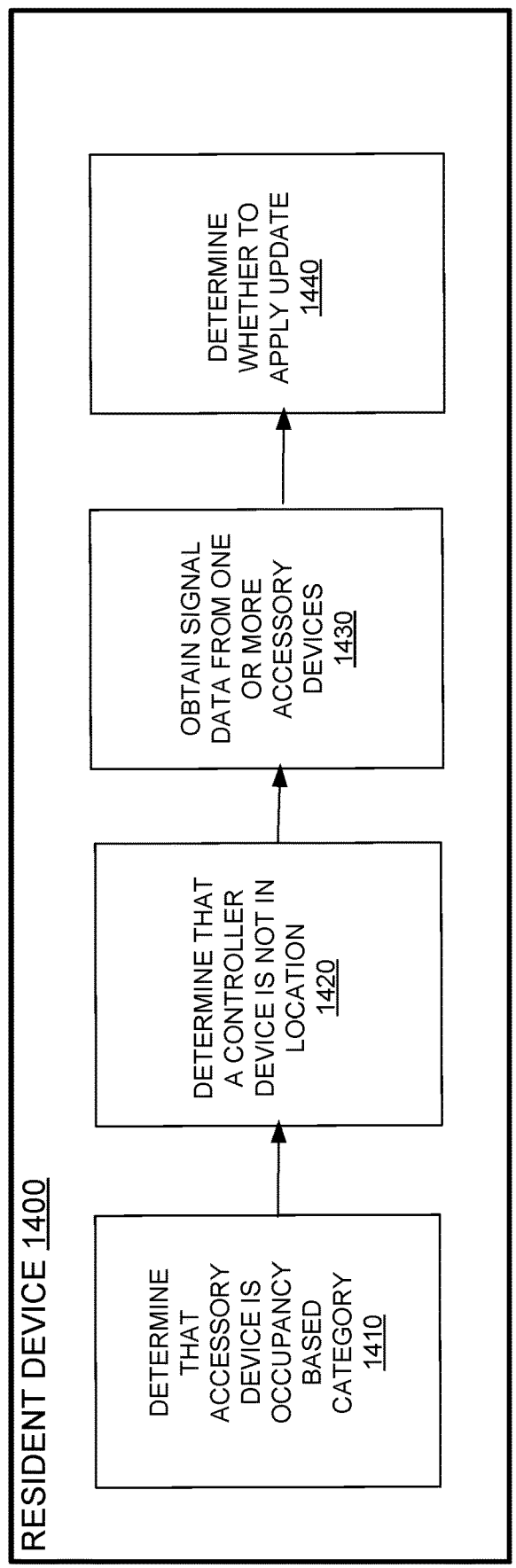
FIG. 14 illustrates a sequence diagram of a method performed by a resident device, in accordance with some example embodiments.

FIG. 14 illustrates a sequence diagram of a method performed by a resident device 1400, in accordance with some example embodiments. As shown in FIG. 14, a resident device can determine whether a home is occupied can be determine whether an update should be applied for an accessory device of an occupancy based update category. That is, for an accessory device that performs an update based on whether or not a home is occupied.

At step 1410, the resident device can determine that an accessory device to be updated is associated with the occupancy based update category. The resident device can determine an update category of the accessory device by obtaining the information from the accessory device or based on predetermined information provided to the resident device regarding the accessory device.

At step 1420, the resident device can determine that there is no controller device from which to obtain occupancy information. For example, the resident device can determine that there is no controller device within the home that is registered to control accessory devices.

At step 1430, the resident device can obtain signal data from one or more accessory devices in the home, in order to determine whether the home is occupied. The resident device can obtain signals from one or more accessory devices in the automated environment. The signal data obtained from the one or more accessory devices can provide a picture of what devices are currently being used in the home, and how long they are being used, without the need for a controller device.

The accessory devices in an automated environment can be configured to store data regarding their use. For example, a lock can store data regarding when it is being locked and unlocked. The accessory devices can transmit this information to the resident device when requested by the resident device. Accessory devices can also be configured to transmit their activity information to the resident device.

At step 1440, the resident device can determine whether to apply the update based on the signal data obtained from the one or more accessory devices. The resident device can aggregate the data from a plurality of accessory devices and determine that the home the occupancy state of the home. For example, based on the obtained signal data, the resident device can determine that the home is not occupied. If an accessory device update requires that the home be occupied (e.g., security category accessory device), then the update is not performed. If an accessory device rule is that the home is not occupied, then the update can be performed.

E. Dynamic Update

In an example embodiment, an accessory device may be able to notify a controller device when it is available for an update. Such accessory devices can be identified as belonging to the dynamic update category An accessory device associated with the dynamic update category can notify the controller device when it is available to perform an update. Therefore, the controller device does not need to determine whether policy conditions are met. Instead, the controller device can receive a communication from the accessory device when the accessory device is ready for applying an update.

The accessory device of the dynamic category can inform the controller device regarding the best time to update the accessory device. The accessory device can indicate that it is available to perform an update, while it is operating. Alternatively, the accessory device can notify the controller device when it will be operating, and the update can be performed at a time when the accessory device is not operating. Therefore, the controller device does not have to determine that policy conditions are met, such as a particular time period or inactivity of the accessory device. Instead, the controller device can determine that an update can be performed while the accessory device is operating, or the controller device can determine when to perform an update when the accessory device is not operation, based on information received from the accessory device.

Examples of dynamic update accessory devices include devices that do not have a set operating time or devices that operate at odd hours. For example, a sprinkler is an example of a dynamic update accessory device. Instead of requiring policy conditions to be met, the sprinkler can notify the controller device regarding the best time to perform an update.

Some devices may be able to maintain their power state while applying an update. For example, a fan or light may be able to continue operating while applying an update. Therefore, devices in the dynamic update category can notify the controller device when it is or is not ready for an update.

Figure 15:
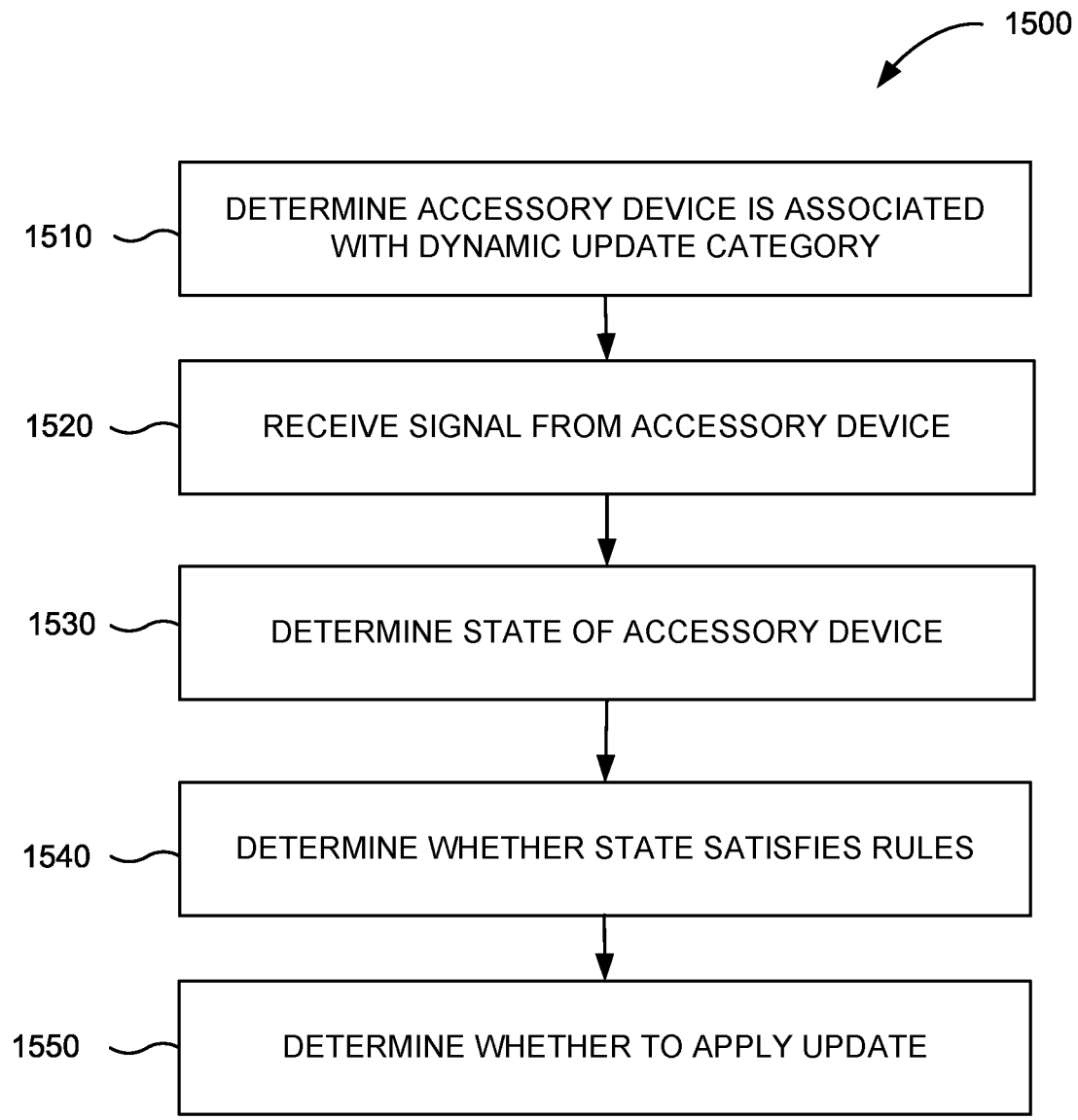
FIG. 15 illustrates a flowchart of a method for applying an update to an accessory device associated with the dynamic update category, in accordance with some example embodiments.

FIG. 15 illustrates a flowchart of a method 1500 for applying an update to an accessory device associated with the dynamic update category, in accordance with some example embodiments.

At step 1510, the controller device can determine that an accessory device to be updated is associated with the dynamic update category. The controller device can determine an update category of the accessory device by obtaining the information from the accessory device or based on predetermined information provided to the controller device regarding the accessory device.

At step 1520, the controller device can receive a signal from the accessory device to be updated indicating a state of the accessory device. The signal can include information such as whether the accessory device is currently operating or a processing capacity of the accessory device that is being used.

At step 1530, based on the signal received from the accessory device, the controller device can determine the state of the accessory device to be updated. For example, the controller device can determine that the accessory device is currently operating at full capacity or if the accessory device is available for an update.

At step 1540, based on the state of the accessory device, the controller device can determine whether the state is a state in which an update can be applied. For example, if the accessory device is not in use, the controller device can determine that the update can be applied.

At step 1550, if the state of the accessory device is a state in which an update can be applied, the update can be applied to the accessory device. If the state of the accessory device is a state in which the update cannot be applied, then the update is not performed. The user can be notified that the update was not performed or an attempt to perform the update can be done at a later time.

F. Multifunction Update

As discussed above, accessory devices can belong to one or more categories. Depending on the category associated with the accessory device, there are different rules for applying the firmware update. Further, the rules associated with the different categories of accessory devices will vary based on whether the automated environment includes a resident device.

The rules associated with each of the categories can vary based on whether a resident device exists in the home. Specifically, since a resident device can provide additional information, rules for each of the categories can vary based on the information that is available from the resident device. If a resident device exists in the home, each of the different categories of devices can follow a first set of rules. If a resident device does not exist in the home, each of the different categories of devices can follow a second set of rules that is different from the first set of rules. In some cases, the accessory devices may follow the same set of rules regardless of whether a resident device exists in the home.

Figure 16:
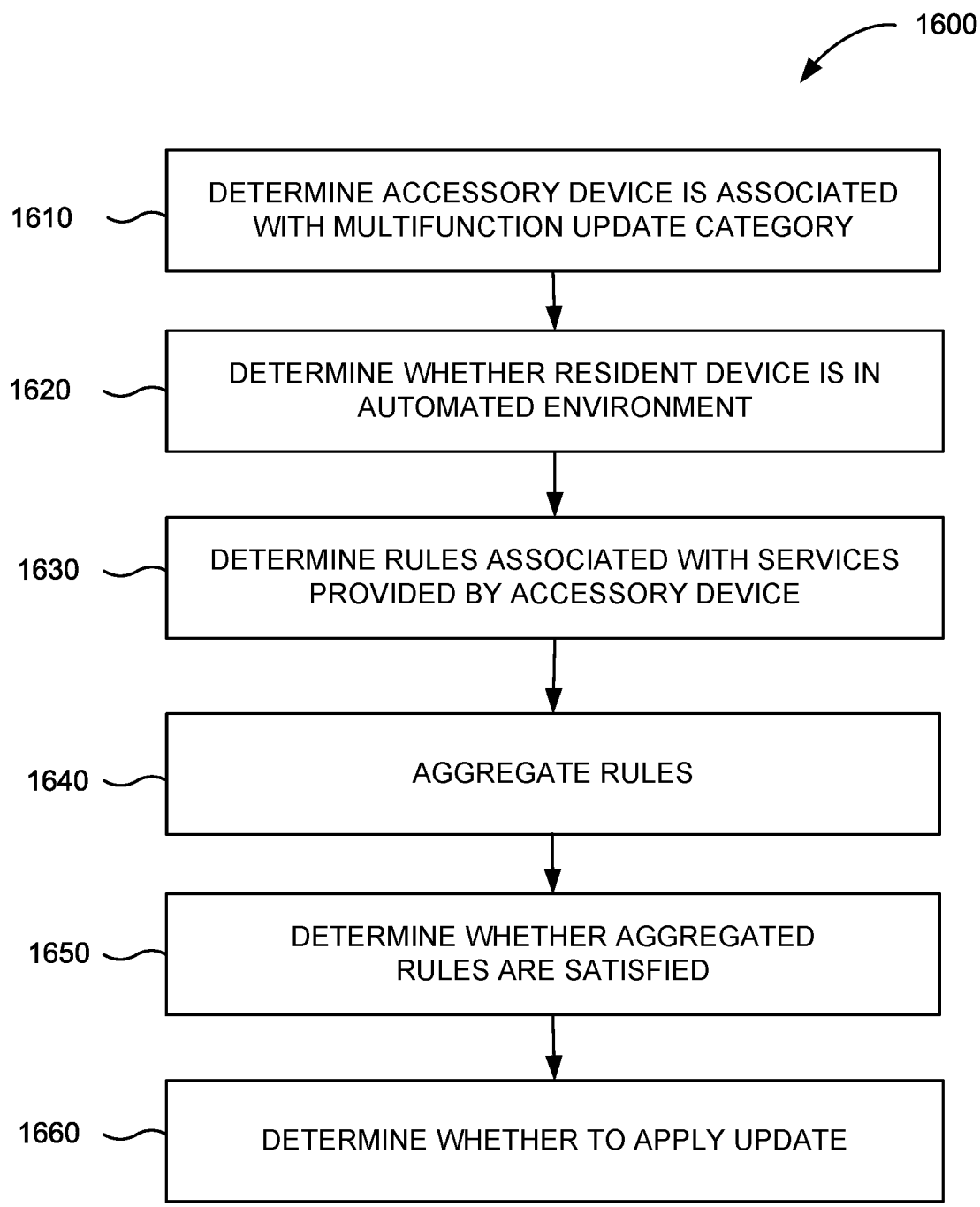
FIG. 16 illustrates a flowchart of a method for applying an update to an accessory device associated with the multi-function category, in accordance with some example embodiments.

FIG. 16 illustrates a flowchart of a method 1600 for applying an update to an accessory device associated with the multi-function category, in accordance with some example embodiments. An accessory device of the multi-function category is configured to provide a plurality of services. For example, a single device such as a ceiling fan can provide services associated with the fan and services associated with a light on the ceiling fan.

At step 1610, it is determined whether the accessory device is of the multi-function category. For example, a ceiling fan may be a fan, but the ceiling fan can also include a light. Therefore, a ceiling can is a multi-function accessory device that can perform different services (e.g., fan and light). The controller device an determine an update category of the accessory device by obtaining the information from the accessory device or based on predetermined information provided to the controller device regarding the accessory device.

In an example embodiment, in order to perform a firmware update to a multi-function category accessory device, all of the rules associated with all of the services should be met prior to applying the firmware update. In an alternative embodiment, in order to perform a firmware update to a multi-function category accessory device, only the rules associated with a primary service need to be met prior to applying the firmware update.

At step 1620, it is determined whether there is a resident device. Although determining whether there is a resident device is described with respect to step 1620, the determination as to the existence of the resident device can be performed at any point so as to determine the rules to be applied.

At step 1630, the rules for applying the update are determined based on whether there is a resident device. If there is a resident device, a first set of rules can be applied for the multi-function category device. If there is no resident device, then a second set of rules can be applied for the multi-function category device. Since the accessory device is a multi-function devices, the rules for updating all of the services provided by the accessory device are obtained.

At step 1640, the rules for the first service and the second service are aggregated. The rules are aggregated so that it can be easily determined which rules need to be met.

At step 1650, the controller device determines whether the rules for the first service and/or the second service are satisfied.

In some instances, all of the rules for the first service and the second service may need to be met in order to apply the update. In some instances, all of the rules for all of the services do not need to be met. For example, between the services offered by the accessory device, only the rules for the primary service need to be met before applying the update. This can vary depending on, for example, the type of update to be performed.

Therefore, in some instances a predetermined number of the policy rules only need to be met. The predetermined number of policy rules can vary depending on the type of services provided by the accessory device. For example, with a ceiling fan, the fan may be the primary service and the light may be the secondary service. Therefore, if all of the rules for the primary service and the secondary service cannot be met, e.g., not met within a predetermined period of time, or do no need to be met (e.g., depending on the type of update) it may be determined that only a predetermined number of rules need to be met, or only the rules for the primary device need to be met.

At step 1660, the controller device can determine whether to apply the update. The update can be performed to all components of the multi-function device or may be applied to certain components of the multi-function device. If the rules are not met, or if a sufficient number of the rules are not met, the controller device can indicate that the update was not performed or the controller device can attempt to perform the update at a later time.

G. Bridge Update

An accessory device associated with the bridge update category can include an accessory device that operates through a bridge device. The bridge device can act as an access point to the accessory device. The bridge device can communicate with the accessory device via a communication protocol.

In order to update an accessory device associated with the bridge device, the bridge device should be notified that an update is to be applied to the accessory device. In some instances, an update may also need to be applied to the bridge device.

Figure 17:
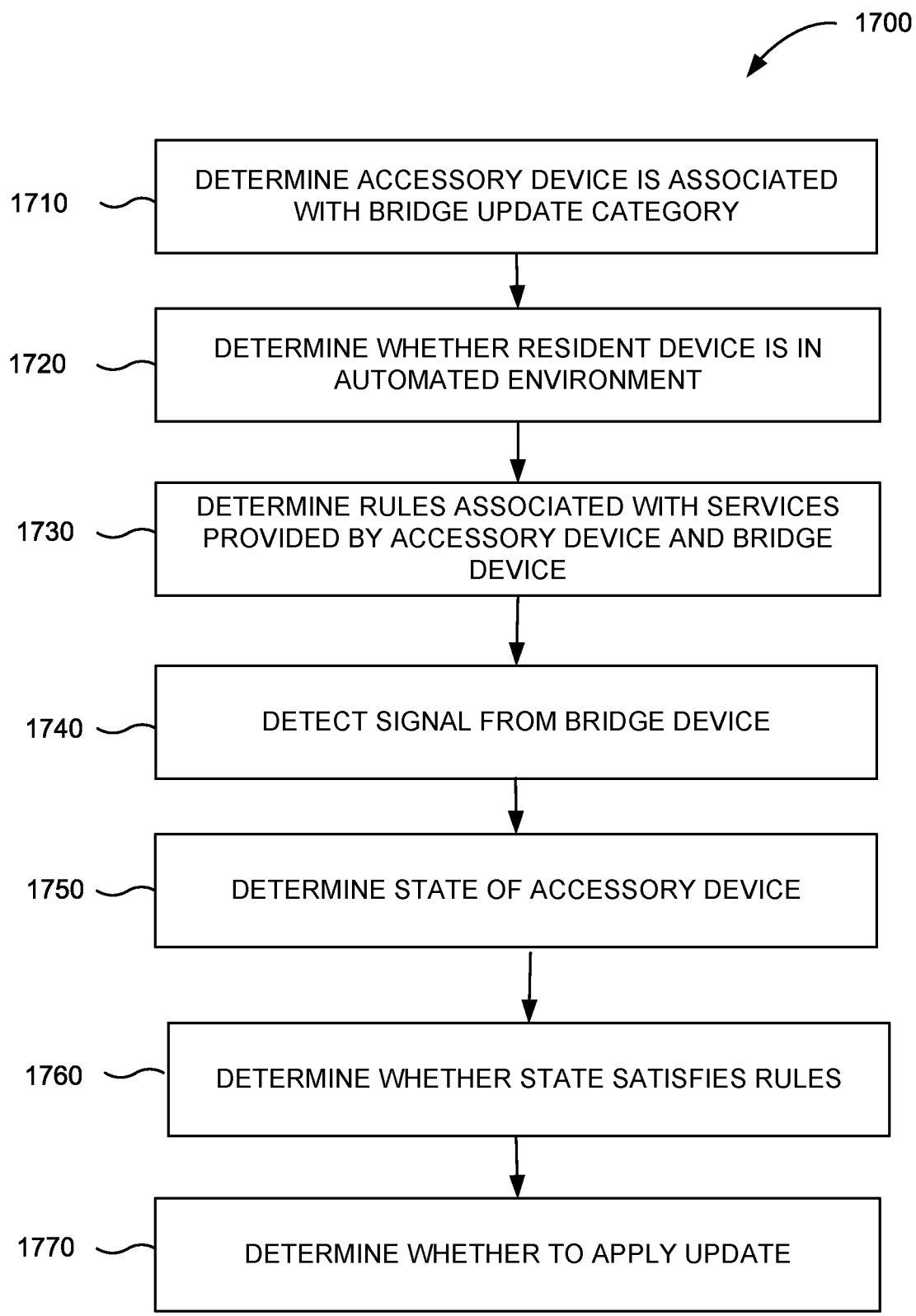
FIG. 17 illustrates a flowchart of a method for applying an update to an accessory device associated with the bridge update category, in accordance with some example embodiments.

FIG. 17 illustrates a flowchart of a method 1700 for applying an update to an accessory device associated with the bridge update category, in accordance with some example embodiments.

At step 1710, the controller device can determine that an accessory device to be updated is associated with the bridge update category. The controller device an determine an update category of the accessory device by obtaining the information from the accessory device or based on predetermined information provided to the controller device regarding the accessory device.

At step 1720, it is determined whether there is a resident device. Although determining whether there is a resident device is described with respect to step 1720, the determination as to the existence of the resident device can be performed at any point so that the rules to be applied can be determined.

At step 1730, the rules for applying the update are determined based on whether there is a resident device. If there is a resident device, a first set of rules can be applied. If there is no resident device, then a second set of rules can be applied. The rules for an accessory device of the bridge update category can also include rules associated with the bridge device.

At step 1740, the controller device can detect a signal from the bridge device. The bridge device can communicate with the accessory device to be updated and the bridge device can determine a state of the accessory device. The bridge device can provide state information of the accessory device to the controller device. The bridge device can notify the controller device as to whether the accessory device is available for an update.

At step 1750, the controller device can determine, based on the signal from the bridge device the state of the accessory device. Specifically, the signal can indicate whether the accessory device is currently in use or not or if the accessory device can be updated.

At step 1760, the controller device determines whether the rules for applying the update are met. In the case of a bridge update category, the rules can include rules associated with the bridge device in additional to rules associated with the accessory device. In some instances, the bridge device will also need to be updated in order to update the accessory device.

At step 1770, the controller device can determine whether to apply the update to accessory device and/or the bridge device. If the rules are met for the accessory device and the bridge device, then the update can be performed. If the rules are not met for the accessory device and/or the bridge device, then the process can end. The controller device can attempt to perform the update at a later time or can notify a user that the update was not successful.

H. Time-based Update

Figure 18:
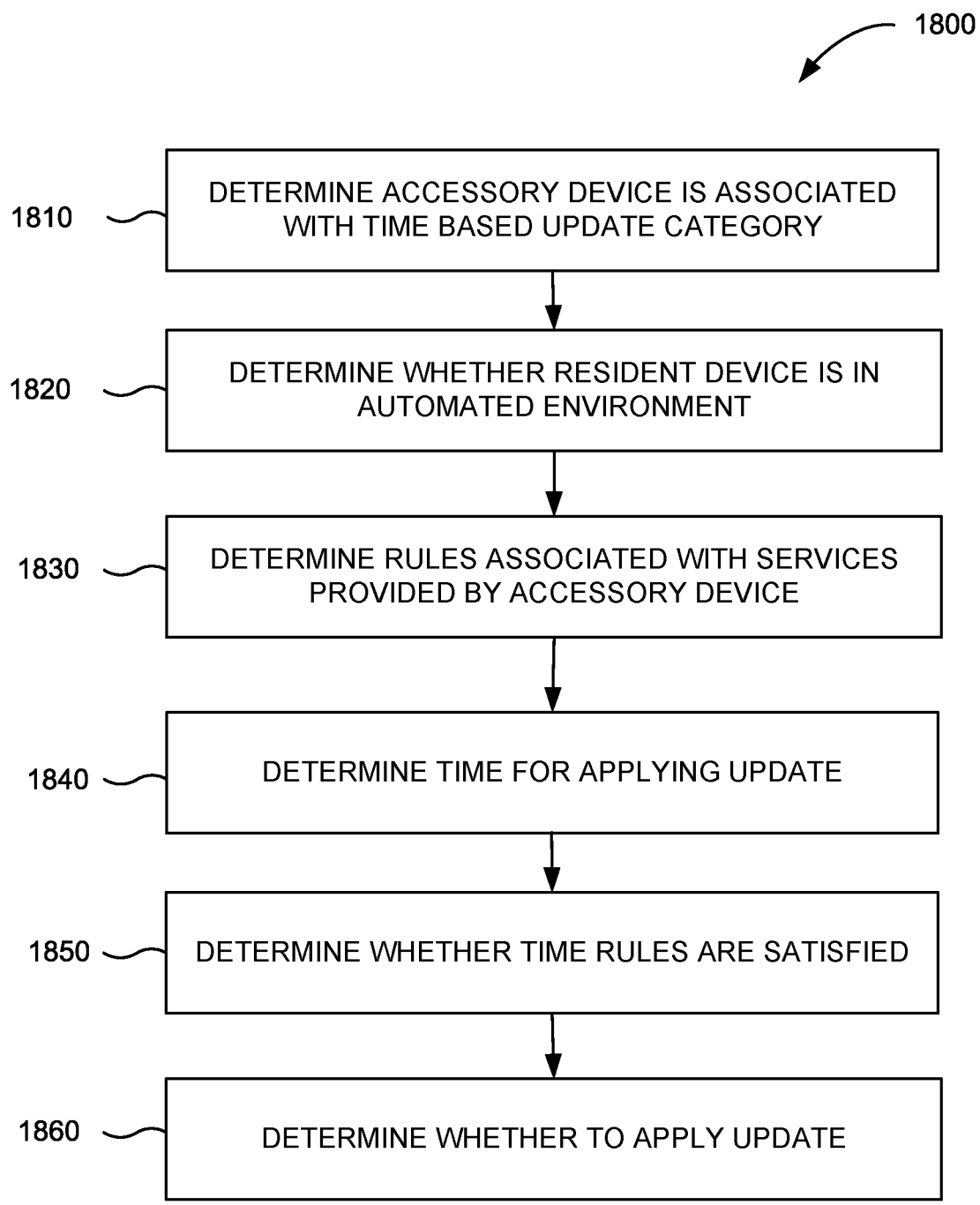
FIG. 18 illustrates a flowchart of a method for applying an update to an accessory device associated with the time based update category, in accordance with some example embodiments.

FIG. 18 illustrates a flowchart of a method 1800 for applying an update to an accessory device associated with the time based update category, in accordance with some example embodiments. An accessory device associated with the time based update category is updated when time conditions are met.

At step 1810, the controller device can determine that an accessory device to be updated is associated with the time based update category. The controller device an determine an update category of the accessory device by obtaining the information from the accessory device or based on predetermined information provided to the controller device regarding the accessory device.

At step 1820, it is determined whether there is a resident device. Although determining whether there is a resident device is described with respect to step 1820, the determination as to the existence of the resident device can be performed at any point so that the rules to be applied can be determined.

At step 1830, the rules for applying the update are determined based on whether there is a resident device. If there is a resident device, a first set of rules can be applied. If there is no resident device, then a second set of rules can be applied.

At step 1840, the controller device can determine a time for applying updates for the accessory device based on the rules to be applied. The time can be determined based on information obtained from the accessory device. The time can be a predetermined time period during which an update can be applied.

At step 1850, the controller device determines whether the rules for applying the update are met. For example, a rule for an accessory device may indicates that updates are to be performed between a certain period of time (e.g., 2-5 pm).

At step 1860, the controller device can determine whether to apply the update. For example, if the time conditions are met (e.g., it is between 2-5 pm), then the update can be performed. If the time condition is not met, then the update will not be performed. The controller device can attempt to perform the update at a later time.

In accordance with example embodiments, firmware can be updated if the accessory is reachable, the accessory indicates that it is ready for to apply the staged update (not low on battery, etc.), there is no scheduled automation in the time window of the expected update duration, and the conditions of the update policy for different services provided by the accessory are met.

Different types of accessory devices can be different policies. For example, low security devices can have different policies from high-security devices. Further, different functions or services of an accessory device can have different policies.

Low security accessory devices can include a light, an outlet, a switch, a fan, a stateless switch, an air quality sensor, a humidifier sensor, a motion Sensor, an occupy sensor, a flood sensor, a thermostat, thermostat, an air conditioner, an air purifier, a humidifier, a WiFi Router, an IP camera, a speaker, a sprinkler, a TV, a blind or shade, and a remote.

High security accessory devices can include a CO sensor, CO2 sensor, smoke sensor, contact sensor, garage door, door lock, door, window, security System, and IP camera doorbell.

Bridge Accessory devices can include bridge with additional HAP services, bridge with only non-HAP and bridged accessory devices. Bridge accessory devices can include an IP camera, a garage door opener, a light, a switch, etc.

In order for automatic firmware updates to be applied, some accessory devices may have automatic firmware update conditions. That is, in order for the firmware update to be applied, different services provided by an accessory device may have conditions that are identified in an update policy. The conditions of the update policy should be met before installing the firmware update.

Policies can vary depending on whether a resident is in location that includes the accessory device. A location can be a home of a user. A resident can be a person who lives in the location or is currently staying in the location (e.g., guest in a home). A resident can also be known as a user of the accessory devices.

It may not be desired to perform a firmware update if a user is in a location associated with the accessory device. For example, it may not be desired to perform a lock firmware update while the user is at home. Further, it may not be desired to perform a firmware update during times in which a user is likely to be using an accessory device. Therefore, some policy conditions may depend on whether the user is at home or not at home. If a location does not have a resident, firmware updates may be based on a predetermined time period.

Policy conditions for accessory devices such as lights, thermostats, air conditioners, air purifiers humidifiers, speakers, TVs, blinds, shades and TV remotes may include performing the firmware update during a predetermined time period during which no one is at home. For example, the predetermined time period can include a time period (e.g., between 2-5 pm) during which it has been determined that the user is not likely using the accessory device. Therefore, when a user is not at home, the update can be performed at a predetermined time. 2-5 pm is provided as an example time period, however, the time periods can vary depending on various factors such as use and location of the accessory devices.

Policy conditions for accessory devices, such as lights, thermostats, air conditioners, air purifiers humidifiers, speakers, TVs, blinds, shades and TV remotes may include waiting to perform the automatic update installation until there is no one in the home. Therefore, when a user is at home, the update will not be performed until the user is no longer at home.

Policy conditions for accessory devices such as outlets, switches, fans, stateless switches, air quality sensors, humidifier sensors, flood sensors and IP cameras can include performing the firmware update during a predetermined time period whether a user is home or not at home. For example, the predetermined time period can include a time period (e.g., between 2-5 pm) during which it has been determined that the user is not likely using the accessory device. Therefore, whether the user is home or not home, the update for particular accessory devices can be performed at a predetermined time.

Some accessory devices (e.g., outlets, fans, etc.) may be able to perform a firmware update while maintaining their power state. Therefore, some accessory devices may notify the controller device if it is not ready to perform an update.

In order for a motion sensor to be updated, a policy can include that when a user is at home or not at home, performing the update during a predetermined time period (e.g., 2-5 pm) so long as no motion is detected in the home.

In order for the occupy sensor to be automatically updated, a policy can include that when the user is at home or not at home, performing the update during a predetermined time period (e.g., 2-5 pm) so long as no occupancy is detected. That is, it should be determined that no one is currently occupying the home before performing the update.

An accessory device, such as a sprinkler, may be programmed to start at odd hours, depending on the configuration by the user. Therefore, some accessory devices that do not operate at routine hours or operate during unconventional hours can notify the controller device when it is not ready to perform a firmware update. Therefore, such devices may not have a particular policy and can independently determine when an update should be performed and can notify the controller device.

In order for the Wi-Fi router to be updated, the Wi-Fi router can be configured to apply the firmware update. In an example embodiment, in order for the Wi-Fi router to automatically perform the firmware update, a policy can include that the Wi-Fi router is configured so as not to support firmware staging.

In order for an IP camera to be automatically updated, its policy can include that it should not be streaming or recording. A policy for a TV can indicate that the TV can be automatically updated when it is not on and no one is in the home of the user.

High security accessory devices can have different update policies than devices which are not high security devices. High security devices can include devices that affect access or entry into the home.

For example, a CO sensor, a CO2 sensor and a smoke sensor may include policies indicating that such devices cannot updated automatically, and may be required to have a user initiate the update. Alternatively, such devices can be updated automatically when no carbon monoxide or smoke is detected.

Some accessory devices, such as a contact sensor and a doorbell, can include policies in which updates are performed during a predetermined time, whether or not the user is at home. A policy for a doorbell can indicate that the doorbell can be automatically updated if it is not streaming or recording, and no one is in the home.

Accessory devices, such as, garage doors, door locks and windows, can include policies in which updates are performed during a predetermined time when the user is not at home and when the user is at home. For some updates, it may be desired that the user is at home or within proximity of the home in case errors occur during the update and the controller device cannot automatically address the issue.

A policy for a window can indicate that the window can be automatically updated during a predetermined time period when a user is not home. A policy can indicate that firmware for a window can be updated if no one is in the home of the user.

A policy for a security system can indicate that that the security system can be automatically updated if it has been disarmed for a predetermined period of time (e.g., five minutes).

Bridge Accessory devices can include a bridge with additional HAP services and a bridge with only non-HAP bridged accessory devices. Bridge accessory devices can include an IP camera, a garage door opener, a light, a switch, etc. Policies for bridge accessory devices can include that the conditions are met for all of the services provided by the bridge accessory devices.

The above are examples of policies for performing automatic updates. However, the policies can change depending on the capabilities of the specific type of accessory device and based on the needs of the user. For example, the policies can be modified to be more or less restrictive Further, the examples above described are for policies in the home. The policies can vary based on the location of the accessory device.

V. Electronic Device

Figure 10:
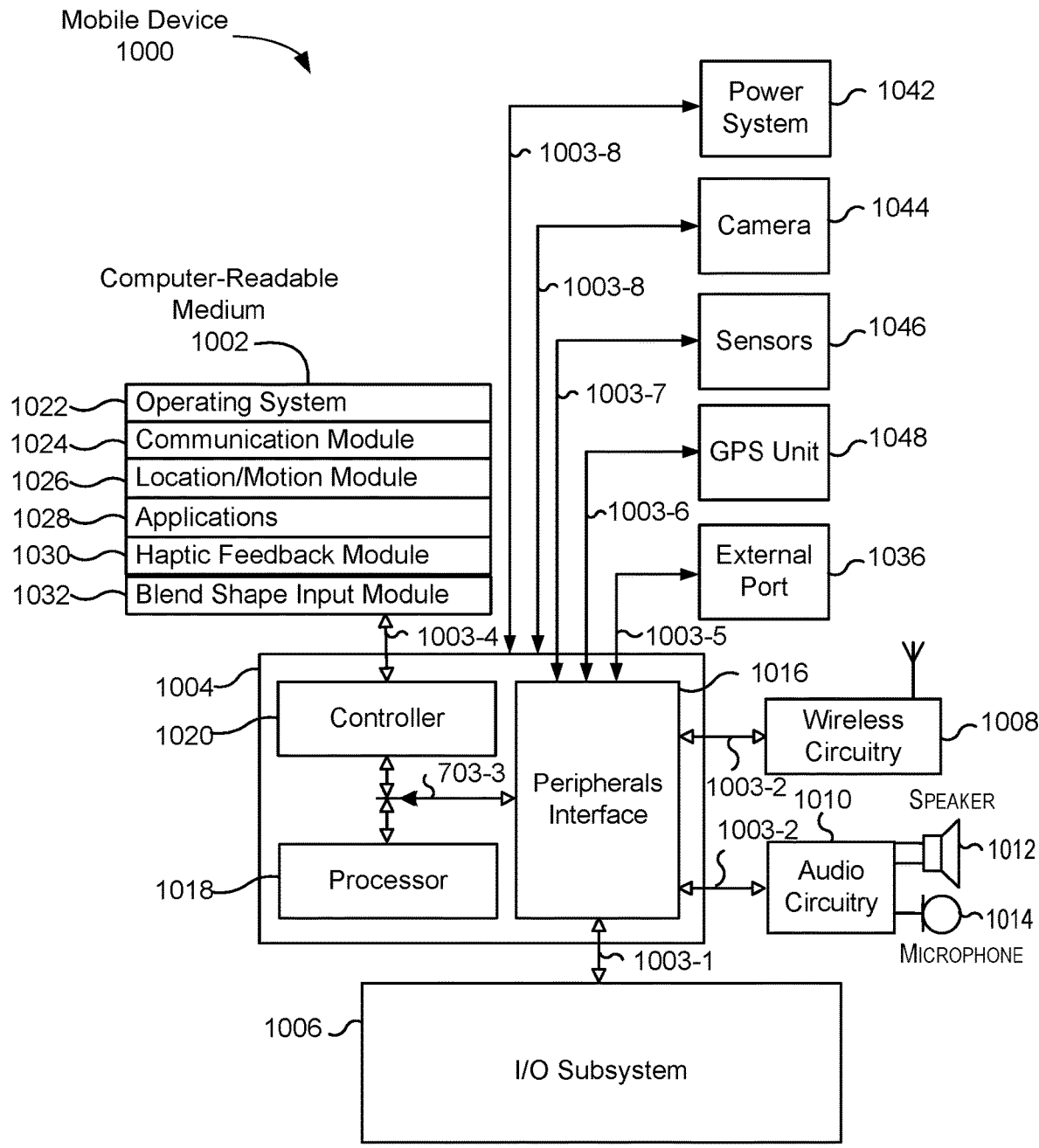
FIG. 10 illustrates a block diagram of an example device, in accordance with some embodiments.

FIG. 10 is a block diagram of an example electronic device 1000. Device 1000 generally includes computer-readable medium 1002, a processing system 1004, an Input/Output (I/O) subsystem 1006, wireless circuitry 1008, and audio circuitry 1010 including speaker 1012 and microphone 1014. Computer-readable medium 1002 can be a non-transitory computer-readable medium. These components may be coupled by one or more communication buses or signal lines 1003. Device 1000 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items. Device 1000 can correspond to a controller device or an accessory device.

It should be apparent that the architecture shown in FIG. 10 is only one example of an architecture for device 1000, and that device 1000 can have more or fewer components than shown, or a different configuration of components. The various components shown in FIG. 10 can be implemented in hardware, software, or a combination of both hardware and software, including one or more signal processing and/or application specific integrated circuits.

Wireless circuitry 1008 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 1008 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1×/EV-DO and LTE/LTE-Advanced) can be used depending on the type of communication or the range of the communication.

Wireless circuitry 1008 is coupled to processing system 1004 via peripherals interface 1016. Peripherals interface 1016 can include conventional components for establishing and maintaining communication between peripherals and processing system 1004. Voice and data information received by wireless circuitry 1008 (e.g., in speech recognition or voice command applications) is sent to one or more processors 1018 via peripherals interface 1016. One or more processors 1018 are configurable to process various data formats.

Peripherals interface 1016 couple the input and output peripherals of device 1000 to the one or more processors 1018 and computer-readable medium 1002. One or more processors 1018 communicate with computer-readable medium 1002 via a controller 1020. Computer-readable medium 1002 can be any device or medium that can store code and/or data for use by one or more processors 1018. Computer-readable medium 1002 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 1016, one or more processors 1018, and controller 1020 can be implemented on a single chip, such as processing system 1004. In some other embodiments, they can be implemented on separate chips.

Processor(s) 1018 can include hardware and/or software elements that perform one or more processing functions, such as mathematical operations, logical operations, data manipulation operations, data transfer operations, controlling the reception of user input, controlling output of information to users, or the like. Processor(s) 1018 can be embodied as one or more hardware processors, microprocessors, microcontrollers, field programmable gate arrays (FPGAs), application-specified integrated circuits (ASICs), or the like.

Device 1000 also includes a power system 1042 for powering the various hardware components. Power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1000 includes a camera 1044. In some embodiments, device 1000 includes sensors 1046. Sensors can include accelerometers, compass, gyrometer, pressure sensors, audio sensors, light sensors, barometers, and the like. Sensors 1046 can be used to sense location aspects, such as auditory or light signatures of a location. In some embodiments, device 1000 can include a GPS receiver, sometimes referred to as a GPS unit 1048. A mobile device can use a satellite navigation system, such as the Global Positioning System (GPS), to obtain position information, timing information, altitude, or other navigation information. In some embodiments, device 1000 can include external port 1036 (e.g., USB, FireWire, Lightning connector, 110-pin connector, etc.). External port 1036 can be adapted for coupling directly to other devices or indirectly over a network (e.g., the Internet, wireless LAN, etc.).

One or more processors 1018 run various software components stored in computer-readable medium 1002 to perform various functions for device 1000. In some embodiments, the software components include operating system 1022, communication module (or set of instructions) 1024, location and motion module 1026, other applications (computer products, sets of instructions, etc.) 1028, and haptic feedback module 1030 and blend shape input module 1032. Operating system 1022 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1024 facilitates communication with other devices over external port 1036 or via wireless circuitry 1008 and includes various software components for handling data received from wireless circuitry 1008 and/or external port 1036.

The one or more applications 1034 on device 1000 can include any applications installed on the device 1000, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

The state information 1028 can include a power state or mode of operation collected about one or more components of device 1000. State information 1028 can include a power state or mode of operation of components of other devices obtained by device 1000. As the mobile device or the companion device, device 1000 can generate local state information and remote state information in state information 1038. Device 1000 (e.g., using wireless circuitry 1008) can use state information 1028 to manage operations locally in order to reduce power usage. Device 1000 can synchronize all or part of the local state information in state information 1028 with the other devices. The other devices can delay sending messages to device 1000 allowing processors 1018 to remain in a sleep state further reducing power consumption.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 1006 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1006 can include a display and user input devices such as a keyboard, mouse, and/or trackpad. In some embodiments, I/O subsystem 1006 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1006 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

The foregoing description may make reference to specific examples of a mobile device (e.g., a wrist-worn device) and/or a companion device (e.g., a smart phone). It is to be understood that these examples are illustrative and not limiting; other devices can be substituted and can implement similar functional blocks and/or algorithms to perform operations described herein and/or other operations.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. As used herein, a processor includes a single-core processor, multi-core processor on a same integrated chip, or multiple processing units on a single circuit board or networked. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Although specific example embodiments have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

As described above, one aspect of the present technology is the gathering and use of data available from specific and legitimate sources to improve the delivery to users of invitational content or any other content that may be of interest to them when updating firmware. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, suggested customizations can be selected and delivered to users by inferring preferences based on non-personal information data or a bare minimum amount of personal information, such as the content being requested by the device associated with a user, other non-personal information available to the avatar application, or publicly available information.

Further, while example embodiments have been described using a particular combination of hardware and software, it should be recognized that other combinations of hardware and software are also within the scope of the example embodiments. Some of the example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

All patents, patent applications, publications, and descriptions mentioned herein are incorporated by reference in their entirety for all purposes. None is admitted to be prior art.

What is claimed is:

1. A method, comprising:
executing, by a controller device, an accessory update service configured to enable firmware updates for an accessory device;
executing, by the controller device, a device management service for managing the accessory device, the device management service configured to maintain a secure channel with the accessory device;
receiving, by the accessory update service, a request to register an interest of the device management service in the accessory device;
registering, by the accessory update service, the interest of the device management service;
identifying, by the accessory update service, that a firmware update for the accessory device is available on a server computer, wherein the identifying is based at least in part on the registered interest of the device management service;
transmitting, by the device management service, a first notification that the firmware update is identified;
receiving, by the accessory update service, a second notification that the accessory device has entered a stage mode for staging the firmware update;
downloading, by the accessory update service, the firmware update from the server computer for the accessory device;
transmitting, by the accessory update service, the firmware update to the accessory device via the secure channel maintained by the device management service; and
instructing, by the device management service, the accessory device to install the firmware update during a second stage.

2. The method of claim 1, wherein the accessory device comprises a third-party accessory device.

3. The method of claim 2, wherein the third-party accessory device comprises a first third-party accessory device and the server computer comprises a first server computer, and wherein the method further comprises:
downloading, by the accessory update service, a second firmware update from a second server computer for a second third-party accessory device, wherein the first server computer and the second server computer are different servers.

4. The method of claim 2, wherein the accessory update service is configured to enable the firmware updates for the third-party accessory device without a third-party application executing on the controller device.

5. The method of claim 1, wherein the firmware update is identified based at least in part on requesting, by the accessory update service, firmware update information from the server computer based at least in part on information that instructs the accessory update service to request the firmware update.

6. The method of claim 5, wherein the information corresponds to a firmware update policy corresponding to the accessory device.

7. The method of claim 1, wherein the method is performed in response to a manual selection to perform a firmware update.

8. The method of claim 1, further comprising determining whether a trickle feed is enabled for the downloading of the firmware update, and if the trickle feed being enabled, performing the downloading of the firmware update for the accessory device gradually over a period of time.

9. A controller device comprising:
a processor;
a memory;
a computer readable medium coupled to the processor, the computer readable medium storing instructions executable by the processor for implementing a method comprising:
executing, by the controller device, an accessory update service configured to enable firmware updates for an accessory device;
executing, by the controller device, a device management service for managing the accessory device, the device management service configured to maintain a secure channel with the accessory device;
receiving, by the accessory update service, a request to register an interest of the device management service in the accessory device;
registering, by the accessory update service, the interest of the device management service;
identifying, by the accessory update service, that a firmware update for the accessory device is available on a server computer, wherein the identifying is based at least in part on the registered interest of the device management service;
transmitting, by the device management service, a first notification that the firmware update is identified;
receiving, by the accessory update service, a second notification that the accessory device has entered a stage mode for staging the firmware update;
downloading, by the accessory update service, the firmware update from the server computer for the accessory device;
transmitting, by the accessory update service, the firmware update to the accessory device via the secure channel maintained by the device management service; and
instructing, by the device management service, the accessory device to install the firmware update during a second stage.

10. The controller device of claim 9, wherein the accessory device comprises a third-party accessory device.

11. The controller device of claim 10, wherein the third-party accessory device comprises a first third-party accessory device and the server computer comprises a first server computer, and wherein the method further comprises:
downloading, by the accessory update service, a second firmware update from a second server computer for a second third-party accessory device, wherein the first server computer and the second server computer are different servers.

12. The controller device of claim 10, wherein the accessory update service is configured to enable the firmware updates for the third-party accessory device without a third-party application executing on the controller device.

13. A non-transitory computer readable medium including instructions configured to cause one or more processors to perform operations comprising:
executing, by a controller device, an accessory update service configured to enable firmware updates for an accessory device;
executing, by the controller device, a device management service for managing the accessory device, the device management service configured to maintain a secure channel with the accessory device;
receiving, by the accessory update service, a request to register an interest of the device management service in the accessory device;

registering, by the accessory update service, the interest of the device management service;

identifying, by the accessory update service, that a firmware update for the accessory device is available on a server computer, wherein the identifying is based at least in part on the registered interest of the device management service;

transmitting, by the device management service, a first notification that the firmware update is identified;

receiving, by the accessory update service, a second notification that the accessory device has entered a stage mode for staging the firmware update;

downloading, by the accessory update service, the firmware update from the server computer for the accessory device;

transmitting, by the accessory update service, the firmware update to the accessory device via the secure channel maintained by the device management service; and instructing, by the device management service, the accessory device to install the firmware update during a second stage.

14. The computer readable medium of claim 13, wherein the accessory device comprises a third-party accessory device.

15. The computer readable medium of claim 14, wherein the third-party accessory device comprises a first third-party accessory device and the server computer comprises a first server computer, and wherein the computer readable medium comprises instructions configured to cause the one or more processors to perform operations further comprising:

downloading, by the accessory update service, a second firmware update from a second server computer for a second third-party accessory device, wherein the first server computer and the second server computer are different servers.

16. The computer readable medium of claim 14, wherein the accessory update service is configured to enable the firmware updates for the third-party accessory device without a third-party application executing on the controller device.

* * * * *

UNITED STATES PATENT AND TRADEMARK OFFICE
CERTIFICATE OF CORRECTION

| | |
|---|---|
| PATENT NO. | : 11,275,576 B2 |
| APPLICATION NO. | : 17/111411 |
| DATED | : March 15, 2022 |
| INVENTOR(S) | : Hung Q. Le et al. |

It is certified that error appears in the above-identified patent and that said Letters Patent is hereby corrected as shown below:

In the Specification

Column 6, Line 6; delete "trickle feed system updating 121" and insert --trickle feed updating system 121--.

Column 12, Lines 9-10; delete "the user can be notified the user can be notified that" and insert --the user can be notified that--.

Column 13, Lines 62-63; delete "value can be can be sent" and insert --value can be sent--.

Signed and Sealed this
Twenty-fourth Day of October, 2023

Katherine Kelly Vidal
*Director of the United States Patent and Trademark Office*